United States Patent
Dinan

(10) Patent No.: US 11,622,372 B2
(45) Date of Patent: *Apr. 4, 2023

(54) COMMUNICATION DEVICE

(71) Applicant: Comcast Cable Communications, LLC, Philadelphia, PA (US)

(72) Inventor: Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/353,232

(22) Filed: Jun. 21, 2021

(65) Prior Publication Data

US 2022/0046633 A1   Feb. 10, 2022

Related U.S. Application Data

(63) Continuation of application No. 16/731,567, filed on Dec. 31, 2019, now Pat. No. 11,076,392, which is a
(Continued)

(51) Int. Cl.
*H04W 72/21* (2023.01)
*H04W 74/00* (2009.01)
(Continued)

(52) U.S. Cl.
CPC .......... *H04W 72/21* (2023.01); *H04L 5/0053* (2013.01); *H04L 27/26* (2013.01); *H04W 4/70* (2018.02);
(Continued)

(58) Field of Classification Search
CPC .............. H04W 72/0413; H04W 4/70; H04W 72/1289; H04W 74/002; H04W 76/10;
(Continued)

(56) References Cited

U.S. PATENT DOCUMENTS

| 4,954,892 A | 9/1990 | Asai et al. |
| 5,740,167 A | 4/1998 | Taketsugu et al. |

(Continued)

FOREIGN PATENT DOCUMENTS

| EP | 2378820 A2 | 10/2011 |
| EP | 2640138 A1 | 9/2013 |

(Continued)

OTHER PUBLICATIONS

3GPP TSG RAN WG1 #68 R1-110424 Dresden, Germany, Feb. 6-10, 2012 Source: LG Electronics Title: Simultaneous transmissions in multiple TA groups.
(Continued)

*Primary Examiner* — Michael K Phillips
(74) *Attorney, Agent, or Firm* — Banner & Witcoff, Ltd.

(57) ABSTRACT

Wireless communications are described. A device may receive a message. The device may receive application data via a first cell group and a second cell group, and the device may transmit the application data to a communication device. The device may receive application data from a communication device, and the device may transmit the application data via a first cell group and a second cell group.

66 Claims, 12 Drawing Sheets

Related U.S. Application Data continuation of application No. 15/870,102, filed on Jan. 12, 2018, now Pat. No. 10,555,290, which is a continuation of application No. 15/657,903, filed on Jul. 24, 2017, now Pat. No. 10,383,068, which is a continuation of application No. 14/797,082, filed on Jul. 11, 2015, now Pat. No. 9,872,280, which is a continuation of application No. 13/918,987, filed on Jun. 16, 2013, now Pat. No. 9,084,228, said application No. 15/657,903 is a continuation of application No. 14/599,494, filed on Jan. 17, 2015, now Pat. No. 9,717,061, which is a continuation of application No. 13/918,985, filed on Jun. 16, 2013, now Pat. No. 8,971,298, said application No. 15/870,102 is a continuation of application No. 14/797,082, filed on Jul. 11, 2015, now Pat. No. 9,872,280.

(60) Provisional application No. 61/696,115, filed on Aug. 31, 2012, provisional application No. 61/662,191, filed on Jun. 20, 2012, provisional application No. 61/661,329, filed on Jun. 18, 2012.

(51) Int. Cl.
| | |
|---|---|
| *H04L 5/00* | (2006.01) |
| *H04L 27/26* | (2006.01) |
| *H04W 4/70* | (2018.01) |
| *H04W 76/15* | (2018.01) |
| *H04W 76/10* | (2018.01) |
| *H04W 72/23* | (2023.01) |
| *H04W 28/06* | (2009.01) |
| *H04W 28/18* | (2009.01) |
| *H04W 74/08* | (2009.01) |
| *H04L 27/32* | (2006.01) |
| *H04L 1/1867* | (2023.01) |

(52) U.S. Cl.
CPC ......... *H04W 72/23* (2023.01); *H04W 74/002* (2013.01); *H04W 76/10* (2018.02); *H04W 76/15* (2018.02); *H04L 1/1877* (2013.01); *H04L 5/0016* (2013.01); *H04L 27/32* (2013.01); *H04W 28/06* (2013.01); *H04W 28/18* (2013.01); *H04W 74/0833* (2013.01)

(58) Field of Classification Search
CPC ..... H04W 76/15; H04W 28/06; H04W 28/18; H04W 74/0833; H04W 72/21; H04W 72/23; H04L 5/0053; H04L 27/26; H04L 1/1877; H04L 5/0016; H04L 27/32; H04L 27/2602; H04L 27/2607; H04L 27/2613; H04L 5/001; H04L 1/1835; H04L 1/1861
See application file for complete search history.

(56) References Cited

U.S. PATENT DOCUMENTS

| | | | |
|---|---|---|---|
| 6,201,803 | B1 | 3/2001 | Munday et al. |
| 6,714,784 | B1 | 3/2004 | Forssell et al. |
| 6,804,212 | B1 | 10/2004 | Vallstrom et al. |
| 7,352,714 | B2 | 4/2008 | Balachandran et al. |
| 7,881,236 | B2 | 2/2011 | Park et al. |
| 7,912,485 | B2 | 3/2011 | Sinnarajah et al. |
| 8,031,662 | B2 | 10/2011 | Lee et al. |
| 8,077,670 | B2 | 12/2011 | Fan et al. |
| 8,131,295 | B2 | 3/2012 | Wang et al. |
| 8,270,424 | B2 | 9/2012 | Rao |
| 8,280,391 | B2 | 10/2012 | Kim et al. |
| 8,289,922 | B2 | 10/2012 | Ewe et al. |
| 8,315,641 | B2 | 11/2012 | Chun et al. |
| 8,341,485 | B2 | 12/2012 | Riess et al. |
| 8,395,985 | B2 | 3/2013 | Dinan |
| 8,396,475 | B1* | 3/2013 | Bonner ............... H04L 65/1096 455/435.2 |
| 8,422,410 | B2 | 4/2013 | Park et al. |
| 8,432,811 | B2 | 4/2013 | Park et al. |
| 8,462,610 | B1 | 6/2013 | Dinan |
| 8,462,688 | B1 | 6/2013 | Dinan |
| 8,472,471 | B2 | 6/2013 | Yang et al. |
| 8,493,917 | B2 | 7/2013 | Meyer et al. |
| 8,503,322 | B2 | 8/2013 | Krishnamurthy et al. |
| 8,520,497 | B1 | 8/2013 | Dinan |
| 8,526,310 | B2 | 9/2013 | Dinan |
| 8,526,389 | B2 | 9/2013 | Dinan |
| 8,531,966 | B1 | 9/2013 | Dinan |
| 8,537,739 | B1 | 9/2013 | Dinan |
| 8,542,654 | B1 | 9/2013 | Dinan |
| 8,547,929 | B1 | 10/2013 | Dinan |
| 8,553,558 | B1 | 10/2013 | Dinan |
| 8,553,574 | B2 | 10/2013 | Hsu |
| 8,553,655 | B1 | 10/2013 | Dinan |
| 8,553,671 | B2 | 10/2013 | Kim et al. |
| 8,559,405 | B2 | 10/2013 | Dinan |
| 8,565,142 | B1 | 10/2013 | Dinan |
| 8,571,467 | B2 | 10/2013 | Uusitalo et al. |
| 8,576,780 | B2 | 11/2013 | Vujcic |
| 8,588,169 | B2 | 11/2013 | Dinan |
| 8,599,785 | B1 | 12/2013 | Dinan |
| 8,619,727 | B1 | 12/2013 | Dinan |
| 8,625,404 | B2 | 1/2014 | Dinan |
| 8,625,405 | B2 | 1/2014 | Dinan |
| 8,625,524 | B2 | 1/2014 | Dinan |
| 8,644,129 | B2 | 2/2014 | Dinan |
| 8,687,541 | B2 | 4/2014 | Lohr et al. |
| 8,699,317 | B2 | 4/2014 | Dinan |
| 8,717,866 | B2 | 5/2014 | Dinan |
| 8,761,047 | B2 | 6/2014 | Kim et al. |
| 8,767,585 | B2 | 7/2014 | Pelletier et al. |
| 8,774,819 | B2 | 7/2014 | Zhang et al. |
| 8,780,784 | B2 | 7/2014 | Chung et al. |
| 8,804,630 | B2 | 8/2014 | Ito et al. |
| 8,804,668 | B2 | 8/2014 | Dinan |
| 8,811,433 | B2 | 8/2014 | Zhao et al. |
| 8,824,968 | B2 | 9/2014 | Kim et al. |
| 8,831,615 | B2 | 9/2014 | Wei |
| 8,837,304 | B2 | 9/2014 | Yamada |
| 8,867,666 | B2 | 10/2014 | Kim et al. |
| 8,873,443 | B2 | 10/2014 | Haim et al. |
| 8,885,589 | B2 | 11/2014 | Kim et al. |
| 8,897,248 | B2 | 11/2014 | Dinan |
| 8,917,593 | B2 | 12/2014 | Damnjanovic et al. |
| 8,917,605 | B2 | 12/2014 | Pelletier et al. |
| 8,934,438 | B2 | 1/2015 | Dinan |
| 8,934,459 | B2 | 1/2015 | Marinier et al. |
| 8,958,342 | B2 | 2/2015 | Dinan |
| 8,964,590 | B2 | 2/2015 | Dinan |
| 8,964,593 | B2 | 2/2015 | Dinan |
| 8,964,659 | B2 | 2/2015 | Vujcic |
| 8,964,683 | B2 | 2/2015 | Dinan |
| 8,964,780 | B2 | 2/2015 | Dinan |
| 8,964,793 | B2 | 2/2015 | Jang et al. |
| 8,971,280 | B2 | 3/2015 | Dinan |
| 8,971,298 | B2 | 3/2015 | Dinan |
| 8,976,765 | B2 | 3/2015 | Dinan |
| 8,982,852 | B2 | 3/2015 | Dinan |
| 8,989,128 | B2 | 3/2015 | Dinan |
| 8,995,372 | B2 | 3/2015 | Kwon et al. |
| 8,995,381 | B2 | 3/2015 | Dinan |
| 8,995,405 | B2 | 3/2015 | Dinan |
| 8,995,462 | B2 | 3/2015 | Kim et al. |
| 9,001,780 | B2 | 4/2015 | Chen et al. |
| 9,008,050 | B2 | 4/2015 | Feuersanger et al. |
| 9,042,925 | B2 | 5/2015 | Seo et al. |
| 9,054,835 | B2 | 6/2015 | Kwon et al. |
| 9,054,841 | B2 | 6/2015 | Ouchi et al. |
| 9,084,228 | B2 | 7/2015 | Dinan |
| 9,084,270 | B2 | 7/2015 | Dinan |
| 9,107,206 | B2 | 8/2015 | Dinan |
| 9,113,387 | B2 | 8/2015 | Dinan |
| 9,118,452 | B2 | 8/2015 | Park et al. |

(56) References Cited

U.S. PATENT DOCUMENTS

| | | |
|---|---|---|
| 9,137,762 B2 | 9/2015 | Ahn et al. |
| 9,143,297 B2 | 9/2015 | Liang et al. |
| 9,154,215 B2 | 10/2015 | Noh et al. |
| 9,155,092 B2 | 10/2015 | Park et al. |
| 9,161,322 B2 | 10/2015 | Dinan |
| 9,161,323 B2 | 10/2015 | Dinan |
| 9,179,420 B2 | 11/2015 | Dinan |
| 9,179,425 B2 | 11/2015 | Dinan |
| 9,179,454 B2 | 11/2015 | Dinan |
| 9,179,457 B2 | 11/2015 | Dinan |
| 9,185,611 B2 | 11/2015 | Zeng et al. |
| 9,185,700 B2 | 11/2015 | Seo et al. |
| 9,204,406 B2 | 12/2015 | Dinan |
| 9,204,407 B2 | 12/2015 | Dinan |
| 9,210,619 B2 | 12/2015 | Dinan |
| 9,210,664 B2 | 12/2015 | Dinan |
| 9,210,665 B2 | 12/2015 | Dinan |
| 9,210,667 B2 | 12/2015 | Dinan |
| 9,210,676 B2 | 12/2015 | Dinan |
| 9,215,051 B2 | 12/2015 | Dinan |
| 9,215,678 B2 | 12/2015 | Dinan |
| 9,220,116 B2 | 12/2015 | Dinan |
| 9,237,537 B2 | 1/2016 | Dinan |
| 9,241,326 B2 | 1/2016 | Dinan |
| 9,247,503 B2 | 1/2016 | Ahn et al. |
| 9,247,506 B2 | 1/2016 | Krishnamurthy et al. |
| 9,282,521 B2 | 3/2016 | Lim et al. |
| 9,307,539 B2 | 4/2016 | Krishnamurthy et al. |
| 9,319,194 B2 | 4/2016 | Dinan |
| 9,319,909 B2 | 4/2016 | Yamada |
| 9,326,314 B2 | 4/2016 | Kim et al. |
| 9,337,980 B2 | 5/2016 | Ahn et al. |
| 9,344,242 B2 | 5/2016 | Ahn et al. |
| 9,344,985 B2 | 5/2016 | Loehr et al. |
| 9,363,832 B2 | 6/2016 | Dinan |
| 9,374,211 B2 | 6/2016 | Kim et al. |
| 9,386,490 B2 | 7/2016 | Dinan |
| 9,386,604 B2 | 7/2016 | Dinan |
| 9,391,824 B2 | 7/2016 | Dinan |
| 9,392,623 B2 | 7/2016 | Dinan |
| 9,397,875 B2 | 7/2016 | Dinan |
| 9,402,255 B2 | 7/2016 | Lohr et al. |
| 9,408,162 B2 | 8/2016 | Ho et al. |
| 9,414,332 B2 | 8/2016 | Dinan |
| 9,414,340 B2 | 8/2016 | Dinan |
| 9,439,217 B2 | 9/2016 | Feuersaenger et al. |
| 9,456,424 B2 | 9/2016 | Seo et al. |
| 9,461,793 B2 | 10/2016 | Kim et al. |
| 9,461,797 B2 | 10/2016 | Ahn et al. |
| 9,491,782 B2 | 11/2016 | Kim et al. |
| 9,503,989 B2 | 11/2016 | Haim et al. |
| 9,521,632 B2 | 12/2016 | Narasimha et al. |
| 9,578,616 B2 | 2/2017 | Etemad et al. |
| 9,585,164 B2 | 2/2017 | Fong et al. |
| 9,642,161 B2 | 5/2017 | Wu et al. |
| 9,667,398 B2 | 5/2017 | Ahn et al. |
| 9,681,405 B2 | 6/2017 | Jang et al. |
| 9,716,575 B2 | 7/2017 | Ahn et al. |
| 9,717,061 B2 | 7/2017 | Dinan |
| 9,717,084 B2 | 7/2017 | Nishikawa et al. |
| 9,742,539 B2 | 8/2017 | Ahn et al. |
| 9,743,431 B2 | 8/2017 | Dinan |
| 9,749,968 B2 | 8/2017 | Stern-Berkowitz et al. |
| 9,756,581 B2 | 9/2017 | Zhang et al. |
| 9,763,203 B2 | 9/2017 | Dinan |
| 9,794,900 B2 | 10/2017 | Wu |
| 9,801,145 B2 | 10/2017 | Seo et al. |
| 9,838,179 B2 | 12/2017 | Kim et al. |
| 9,838,990 B2 | 12/2017 | Xu et al. |
| 9,854,608 B2 | 12/2017 | Pelletier et al. |
| 9,913,258 B2 | 3/2018 | Kim et al. |
| 9,949,221 B2 | 4/2018 | Yamada |
| 9,991,999 B2 | 6/2018 | Ahn et al. |
| 10,009,864 B2 | 6/2018 | Etemad et al. |
| 10,033,499 B2 | 7/2018 | Ahn et al. |
| 10,039,131 B2 | 7/2018 | Dinan |
| 10,098,070 B2 | 10/2018 | Haim et al. |
| 10,206,181 B2 | 2/2019 | Ekpenyoung et al. |
| 10,250,368 B2 | 4/2019 | Ahn et al. |
| 10,349,361 B2 | 7/2019 | Feuersaenger et al. |
| 10,375,655 B2 | 8/2019 | Dinan et al. |
| 10,531,495 B2 | 1/2020 | Dinan |
| 10,536,910 B2 | 1/2020 | Gaal et al. |
| 10,568,048 B2 | 2/2020 | Stem-Berkowitz et al. |
| 10,588,154 B2 | 3/2020 | Pelletier et al. |
| 10,863,551 B2 | 12/2020 | Dinan |
| 10,869,278 B2 | 12/2020 | Haim et al. |
| 10,887,846 B2 | 1/2021 | Zhang et al. |
| 2003/0002482 A1 | 1/2003 | Kubler et al. |
| 2003/0087647 A1 | 5/2003 | Hurst |
| 2004/0001448 A1 | 1/2004 | Preston et al. |
| 2004/0202119 A1 | 10/2004 | Edge |
| 2005/0037786 A1 | 2/2005 | Edge |
| 2005/0063356 A1 | 3/2005 | Larsen et al. |
| 2007/0002890 A1 | 1/2007 | Mangold et al. |
| 2007/0032255 A1 | 2/2007 | Koo et al. |
| 2007/0149196 A1 | 6/2007 | Choi et al. |
| 2007/0189205 A1 | 8/2007 | Terry et al. |
| 2007/0207828 A1 | 9/2007 | Cheng et al. |
| 2007/0248113 A1 | 10/2007 | Ko et al. |
| 2007/0293224 A1 | 12/2007 | Wang et al. |
| 2008/0039087 A1 | 2/2008 | Gallagher et al. |
| 2008/0069053 A1 | 3/2008 | Kim et al. |
| 2008/0084849 A1 | 4/2008 | Wang et al. |
| 2008/0102842 A1 | 5/2008 | Kim |
| 2008/0102896 A1 | 5/2008 | Wang et al. |
| 2008/0123576 A1 | 5/2008 | Son et al. |
| 2008/0130585 A1 | 6/2008 | Park et al. |
| 2008/0137632 A1 | 6/2008 | Choi et al. |
| 2008/0182579 A1 | 7/2008 | Wang et al. |
| 2008/0267127 A1 | 10/2008 | Narasimha et al. |
| 2009/0109838 A1 | 4/2009 | Kuo |
| 2009/0181687 A1 | 7/2009 | Tiirola et al. |
| 2009/0186613 A1 | 7/2009 | Ahn et al. |
| 2009/0238121 A1 | 9/2009 | Kotecha |
| 2009/0239545 A1 | 9/2009 | Lee et al. |
| 2009/0276675 A1 | 11/2009 | Ojala et al. |
| 2009/0285193 A1 | 11/2009 | Kim et al. |
| 2009/0316637 A1 | 12/2009 | Yi et al. |
| 2009/0316678 A1 | 12/2009 | Yamada et al. |
| 2010/0008333 A1 | 1/2010 | Kim et al. |
| 2010/0020760 A1 | 1/2010 | Grandblaise et al. |
| 2010/0035581 A1 | 2/2010 | Park et al. |
| 2010/0056160 A1 | 3/2010 | Kim et al. |
| 2010/0067470 A1 | 3/2010 | Damnjanovic et al. |
| 2010/0069071 A1 | 3/2010 | Simonsson et al. |
| 2010/0098011 A1 | 4/2010 | Pelletier et al. |
| 2010/0113082 A1 | 5/2010 | Ishii et al. |
| 2010/0118730 A1 | 5/2010 | Tanaka et al. |
| 2010/0118788 A1 | 5/2010 | Ohta et al. |
| 2010/0128683 A1 | 5/2010 | Zangi et al. |
| 2010/0130137 A1 | 5/2010 | Pelletier et al. |
| 2010/0144353 A1 | 6/2010 | Chong et al. |
| 2010/0184446 A1 | 7/2010 | Moon et al. |
| 2010/0195532 A1 | 8/2010 | Pajukoski et al. |
| 2010/0195566 A1 | 8/2010 | Krishnamurthy et al. |
| 2010/0215004 A1 | 8/2010 | Yoo |
| 2010/0227569 A1 | 9/2010 | Bala et al. |
| 2010/0238872 A1 | 9/2010 | Kim et al. |
| 2010/0238908 A1 | 9/2010 | Wu |
| 2010/0246561 A1 | 9/2010 | Shin et al. |
| 2010/0254356 A1 | 10/2010 | Tynderfeldt et al. |
| 2010/0279695 A1 | 11/2010 | Amirijoo et al. |
| 2010/0290427 A1 | 11/2010 | Sebire et al. |
| 2010/0296465 A1 | 11/2010 | Hooli et al. |
| 2010/0302998 A1 | 12/2010 | Bao et al. |
| 2010/0303039 A1 | 12/2010 | Zhang et al. |
| 2010/0309877 A1 | 12/2010 | Damnjanovic et al. |
| 2011/0039568 A1 | 2/2011 | Zhang et al. |
| 2011/0039593 A1 | 2/2011 | Lee et al. |
| 2011/0044287 A1 | 2/2011 | Park et al. |
| 2011/0059777 A1* | 3/2011 | Rao ............ H04B 1/3888 455/566 |
| 2011/0081936 A1 | 4/2011 | Haim et al. |

(56) References Cited

U.S. PATENT DOCUMENTS

| | | |
|---|---|---|
| 2011/0085491 A1 | 4/2011 | Tynderfeldt et al. |
| 2011/0092219 A1 | 4/2011 | Damnjanovic et al. |
| 2011/0098054 A1 | 4/2011 | Gorokhov et al. |
| 2011/0105107 A1 | 5/2011 | Kwon et al. |
| 2011/0111749 A1 | 5/2011 | Kim et al. |
| 2011/0128935 A1 | 6/2011 | Jang et al. |
| 2011/0134774 A1 | 6/2011 | Pelletier et al. |
| 2011/0158116 A1 | 6/2011 | Tenny et al. |
| 2011/0158117 A1 | 6/2011 | Ho et al. |
| 2011/0170535 A1 | 7/2011 | Wang et al. |
| 2011/0194455 A1 | 8/2011 | Aminaka et al. |
| 2011/0194493 A1 | 8/2011 | Centonza et al. |
| 2011/0199944 A1 | 8/2011 | Chen et al. |
| 2011/0200014 A1 | 8/2011 | Lee et al. |
| 2011/0200032 A1 | 8/2011 | Lindstrom et al. |
| 2011/0201367 A1 | 8/2011 | Aminaka et al. |
| 2011/0218016 A1 | 9/2011 | Hirakawa et al. |
| 2011/0222428 A1 | 9/2011 | Charbit et al. |
| 2011/0222492 A1 | 9/2011 | Borsella et al. |
| 2011/0223932 A1 | 9/2011 | Hole et al. |
| 2011/0243102 A1 | 10/2011 | Sebire et al. |
| 2011/0243106 A1 | 10/2011 | Hsu et al. |
| 2011/0243111 A1 | 10/2011 | Andgart et al. |
| 2011/0249639 A1 | 10/2011 | Jen |
| 2011/0249641 A1 | 10/2011 | Kwon et al. |
| 2011/0250918 A1 | 10/2011 | Jen |
| 2011/0255431 A1 | 10/2011 | Wang et al. |
| 2011/0261776 A1 | 10/2011 | Ahn et al. |
| 2011/0268028 A1 | 11/2011 | Stern-Berkowitz et al. |
| 2011/0268032 A1 | 11/2011 | Kim et al. |
| 2011/0268087 A1 | 11/2011 | Kwon et al. |
| 2011/0269469 A1 | 11/2011 | Xiao et al. |
| 2011/0274063 A1 | 11/2011 | Li |
| 2011/0275335 A1 | 11/2011 | Luo et al. |
| 2011/0281581 A1 | 11/2011 | Brandt et al. |
| 2011/0286409 A1 | 11/2011 | Son et al. |
| 2011/0286411 A1 | 11/2011 | Kim et al. |
| 2011/0292917 A1 | 12/2011 | Fan et al. |
| 2011/0294474 A1 | 12/2011 | Barany et al. |
| 2011/0294508 A1 | 12/2011 | Min et al. |
| 2011/0299489 A1 | 12/2011 | Kim et al. |
| 2011/0300856 A1 | 12/2011 | Aminaka |
| 2011/0310845 A1 | 12/2011 | Jung et al. |
| 2011/0310851 A1* | 12/2011 | Klingenbrunn ...... H04W 28/0226 370/332 |
| 2012/0002568 A1 | 1/2012 | Tiirola et al. |
| 2012/0008524 A1 | 1/2012 | Amirijoo et al. |
| 2012/0008600 A1 | 1/2012 | Marinier et al. |
| 2012/0014371 A1 | 1/2012 | Weng et al. |
| 2012/0021693 A1 | 1/2012 | Wintzell et al. |
| 2012/0026972 A1 | 2/2012 | Miao et al. |
| 2012/0026976 A1 | 2/2012 | Chang et al. |
| 2012/0026977 A1 | 2/2012 | Kim et al. |
| 2012/0039273 A1 | 2/2012 | Nam et al. |
| 2012/0039284 A1 | 2/2012 | Barbieri et al. |
| 2012/0044815 A1 | 2/2012 | Geirhofer et al. |
| 2012/0044906 A1 | 2/2012 | Chen et al. |
| 2012/0057456 A1 | 3/2012 | Bogatin et al. |
| 2012/0063425 A1 | 3/2012 | Wang et al. |
| 2012/0076037 A1 | 3/2012 | Noh et al. |
| 2012/0076088 A1 | 3/2012 | Hwang et al. |
| 2012/0076103 A1 | 3/2012 | Dai et al. |
| 2012/0077484 A1 | 3/2012 | Ji |
| 2012/0082152 A1 | 4/2012 | Baldemair et al. |
| 2012/0093128 A1 | 4/2012 | Song et al. |
| 2012/0106471 A1 | 5/2012 | Behravan et al. |
| 2012/0106495 A1 | 5/2012 | Yang et al. |
| 2012/0106510 A1 | 5/2012 | Kuo |
| 2012/0106511 A1 | 5/2012 | Wu |
| 2012/0113883 A1 | 5/2012 | Osterling |
| 2012/0113914 A1 | 5/2012 | Zhao et al. |
| 2012/0113941 A1 | 5/2012 | Chung et al. |
| 2012/0113962 A1 | 5/2012 | Jen |
| 2012/0120944 A1 | 5/2012 | Yang et al. |
| 2012/0140743 A1 | 6/2012 | Pelletier et al. |
| 2012/0170497 A1 | 7/2012 | Zhang et al. |
| 2012/0170570 A1 | 7/2012 | Chang et al. |
| 2012/0176967 A1 | 7/2012 | Kim et al. |
| 2012/0178456 A1 | 7/2012 | Peisa et al. |
| 2012/0178482 A1 | 7/2012 | Seo et al. |
| 2012/0184206 A1 | 7/2012 | Kim et al. |
| 2012/0188897 A1 | 7/2012 | Shen |
| 2012/0218987 A1 | 8/2012 | Zhao et al. |
| 2012/0218988 A1 | 8/2012 | Xu et al. |
| 2012/0224552 A1 | 9/2012 | Feuersanger et al. |
| 2012/0243498 A1 | 9/2012 | Kwon et al. |
| 2012/0243514 A1 | 9/2012 | Wu |
| 2012/0250520 A1 | 10/2012 | Chen et al. |
| 2012/0257510 A1 | 10/2012 | Jeong et al. |
| 2012/0257513 A1 | 10/2012 | Yamada |
| 2012/0257569 A1 | 10/2012 | Jang et al. |
| 2012/0257570 A1 | 10/2012 | Jang et al. |
| 2012/0257601 A1 | 10/2012 | Kim et al. |
| 2012/0275378 A1 | 11/2012 | Lee |
| 2012/0275390 A1 | 11/2012 | Korhonen et al. |
| 2012/0281680 A1 | 11/2012 | Bostrom et al. |
| 2012/0287865 A1 | 11/2012 | Wu et al. |
| 2012/0294163 A1 | 11/2012 | Turtinen et al. |
| 2012/0300715 A1 | 11/2012 | Pelletier et al. |
| 2012/0300720 A1 | 11/2012 | Gou et al. |
| 2012/0300743 A1 | 11/2012 | Kim et al. |
| 2012/0300752 A1 | 11/2012 | Kwon et al. |
| 2012/0302245 A1 | 11/2012 | Huang |
| 2012/0307811 A1 | 12/2012 | Kwon et al. |
| 2012/0314652 A1 | 12/2012 | Ahn et al. |
| 2012/0314675 A1 | 12/2012 | Vujcic |
| 2012/0322453 A1 | 12/2012 | Weng et al. |
| 2012/0327804 A1 | 12/2012 | Park et al. |
| 2013/0010619 A1 | 1/2013 | Fong et al. |
| 2013/0010684 A1 | 1/2013 | Park et al. |
| 2013/0010704 A1 | 1/2013 | Kronquist et al. |
| 2013/0010711 A1 | 1/2013 | Larsson et al. |
| 2013/0010712 A1 | 1/2013 | Kim et al. |
| 2013/0010723 A1 | 1/2013 | Ouchi et al. |
| 2013/0021980 A1 | 1/2013 | Yang et al. |
| 2013/0028069 A1* | 1/2013 | Pelletier .............. H04W 40/248 370/216 |
| 2013/0028185 A1 | 1/2013 | Wu |
| 2013/0028198 A1 | 1/2013 | Yamada |
| 2013/0028236 A1 | 1/2013 | Jung et al. |
| 2013/0034085 A1 | 2/2013 | Bostrom et al. |
| 2013/0039294 A1 | 2/2013 | Wang |
| 2013/0044617 A1 | 2/2013 | Boixadera et al. |
| 2013/0044831 A1 | 2/2013 | Narasimha et al. |
| 2013/0044843 A1 | 2/2013 | Malkamaki et al. |
| 2013/0058309 A1 | 3/2013 | Kuo |
| 2013/0058315 A1 | 3/2013 | Feuersanger et al. |
| 2013/0064165 A1 | 3/2013 | Chen et al. |
| 2013/0064195 A1 | 3/2013 | Chang |
| 2013/0070726 A1 | 3/2013 | Zhang et al. |
| 2013/0072246 A1 | 3/2013 | Nobukiyo et al. |
| 2013/0078913 A1 | 3/2013 | Lee et al. |
| 2013/0083675 A1 | 4/2013 | Yamada |
| 2013/0083683 A1 | 4/2013 | Hwang et al. |
| 2013/0083747 A1 | 4/2013 | Narasimha et al. |
| 2013/0083753 A1 | 4/2013 | Lee et al. |
| 2013/0083769 A1 | 4/2013 | Qu et al. |
| 2013/0084913 A1 | 4/2013 | Gaal et al. |
| 2013/0094433 A1 | 4/2013 | Nagata et al. |
| 2013/0094466 A1 | 4/2013 | Kim et al. |
| 2013/0100938 A1 | 4/2013 | Kwon et al. |
| 2013/0114398 A1 | 5/2013 | Wang |
| 2013/0114505 A1 | 5/2013 | Haim et al. |
| 2013/0114574 A1 | 5/2013 | Ng et al. |
| 2013/0115952 A1 | 5/2013 | Wei |
| 2013/0115958 A1 | 5/2013 | Wei |
| 2013/0148535 A1 | 6/2013 | Baghel et al. |
| 2013/0148592 A1 | 6/2013 | Noh et al. |
| 2013/0155898 A1 | 6/2013 | Yin et al. |
| 2013/0157669 A1 | 6/2013 | Turtinen et al. |
| 2013/0163550 A1 | 6/2013 | Marinier et al. |
| 2013/0165124 A1 | 6/2013 | Liang et al. |
| 2013/0165126 A1 | 6/2013 | Wei |
| 2013/0176988 A1 | 7/2013 | Wang et al. |

(56) References Cited

U.S. PATENT DOCUMENTS

| | | |
|---|---|---|
| 2013/0183979 A1 | 7/2013 | Chen et al. |
| 2013/0188473 A1 | 7/2013 | Dinan |
| 2013/0188580 A1 | 7/2013 | Dinan |
| 2013/0188617 A1 | 7/2013 | Dinan |
| 2013/0188619 A1 | 7/2013 | Dinan |
| 2013/0188620 A1 | 7/2013 | Dinan |
| 2013/0189930 A1 | 7/2013 | Kinnunen et al. |
| 2013/0194908 A1 | 8/2013 | Gao et al. |
| 2013/0195048 A1 | 8/2013 | Ekpenyong et al. |
| 2013/0195084 A1 | 8/2013 | Chen et al. |
| 2013/0195086 A1 | 8/2013 | Xu et al. |
| 2013/0208601 A1 | 8/2013 | Cui et al. |
| 2013/0235807 A1 | 9/2013 | Lee et al. |
| 2013/0242892 A1 | 9/2013 | Ye |
| 2013/0242911 A1 | 9/2013 | Heo et al. |
| 2013/0250925 A1 | 9/2013 | Lohr et al. |
| 2013/0258957 A1 | 10/2013 | Dinan |
| 2013/0258958 A1 | 10/2013 | Dinan |
| 2013/0260741 A1 | 10/2013 | Yamada |
| 2013/0260821 A1 | 10/2013 | Deparis et al. |
| 2013/0272229 A1 | 10/2013 | Dinan |
| 2013/0279434 A1 | 10/2013 | Dinan |
| 2013/0279435 A1 | 10/2013 | Dinan |
| 2013/0279486 A1 | 10/2013 | Kato et al. |
| 2013/0315094 A1 | 11/2013 | Vannithamby et al. |
| 2013/0315214 A1 | 11/2013 | Bai et al. |
| 2013/0322397 A1 | 12/2013 | Lee et al. |
| 2013/0322409 A1 | 12/2013 | Takahashi et al. |
| 2013/0329675 A1 | 12/2013 | Dinan |
| 2013/0329711 A1 | 12/2013 | Seo et al. |
| 2013/0343358 A1 | 12/2013 | Kato et al. |
| 2014/0016559 A1 | 1/2014 | Jang et al. |
| 2014/0016593 A1 | 1/2014 | Park et al. |
| 2014/0023043 A1 | 1/2014 | Yang et al. |
| 2014/0029575 A1 | 1/2014 | Zeng et al. |
| 2014/0029586 A1 | 1/2014 | Loehr et al. |
| 2014/0050205 A1 | 2/2014 | Ahn et al. |
| 2014/0056244 A1 | 2/2014 | Frenne et al. |
| 2014/0056251 A1 | 2/2014 | Ahn et al. |
| 2014/0064233 A1 | 3/2014 | Oizumi et al. |
| 2014/0079032 A1 | 3/2014 | Bergstrom et al. |
| 2014/0086182 A1 | 3/2014 | Shin et al. |
| 2014/0086213 A1 | 3/2014 | Kwon et al. |
| 2014/0086224 A1 | 3/2014 | Kwon et al. |
| 2014/0092812 A1 | 4/2014 | Jang et al. |
| 2014/0105192 A1 | 4/2014 | Park et al. |
| 2014/0112308 A1 | 4/2014 | Kwon et al. |
| 2014/0126475 A1 | 5/2014 | Ahn et al. |
| 2014/0161089 A1 | 6/2014 | Ahn et al. |
| 2014/0185595 A1 | 7/2014 | Wu et al. |
| 2014/0192798 A1 | 7/2014 | Yang et al. |
| 2014/0198748 A1 | 7/2014 | Lee et al. |
| 2014/0213244 A1 | 7/2014 | Oh et al. |
| 2014/0219185 A1 | 8/2014 | Etemad et al. |
| 2014/0233542 A1 | 8/2014 | Bergstrom et al. |
| 2014/0293947 A1 | 10/2014 | Nishikawa et al. |
| 2014/0307670 A1 | 10/2014 | Kim et al. |
| 2014/0308956 A1 | 10/2014 | Zhang et al. |
| 2014/0321406 A1 | 10/2014 | Marinier et al. |
| 2014/0321442 A1 | 10/2014 | Kim et al. |
| 2014/0328326 A1 | 11/2014 | Gunnarsson et al. |
| 2014/0334448 A1 | 11/2014 | Langereis et al. |
| 2014/0341109 A1* | 11/2014 | Cartmell ............ H04W 28/0263 370/328 |
| 2014/0348078 A1 | 11/2014 | Kim et al. |
| 2014/0349713 A1 | 11/2014 | Yamada |
| 2014/0369317 A1 | 12/2014 | Ye |
| 2014/0369322 A1 | 12/2014 | Fwu et al. |
| 2015/0031409 A1 | 1/2015 | Ahn et al. |
| 2015/0031410 A1 | 1/2015 | Lim et al. |
| 2015/0036601 A1 | 2/2015 | Kim et al. |
| 2015/0043524 A1 | 2/2015 | Kim et al. |
| 2015/0063245 A1 | 3/2015 | Gao et al. |
| 2015/0063262 A1 | 3/2015 | Ji et al. |
| 2015/0071236 A1 | 3/2015 | Baldemair et al. |
| 2015/0208358 A1 | 7/2015 | Ahn et al. |
| 2015/0249527 A1 | 9/2015 | Hwang et al. |
| 2015/0296542 A1 | 10/2015 | Heo et al. |
| 2015/0327249 A1 | 11/2015 | Kitazoe et al. |
| 2016/0080126 A1 | 3/2016 | Dinan |
| 2016/0100372 A1 | 4/2016 | Dinan |
| 2016/0249299 A1 | 8/2016 | Ahn et al. |
| 2017/0099658 A1 | 4/2017 | Shattil |
| 2017/0353931 A1 | 12/2017 | Stern-Berkowitz et al. |
| 2020/0245257 A1 | 7/2020 | Pelletier et al. |
| 2021/0099960 A1 | 4/2021 | Haim et al. |

FOREIGN PATENT DOCUMENTS

| | | |
|---|---|---|
| WO | 2011016377 A1 | 2/2011 |
| WO | 2011023057 A1 | 3/2011 |
| WO | 2011050856 A1 | 5/2011 |
| WO | 2011085200 A1 | 7/2011 |
| WO | 2011120716 A1 | 10/2011 |
| WO | 2012036704 A1 | 3/2012 |
| WO | 2013025237 A1 | 2/2013 |
| WO | 2014085967 A1 | 6/2014 |

OTHER PUBLICATIONS

3GPP TSG RAN WG1 #68 R1-120462 Dresden, Germany, Feb. 6-10, 2012 Source: Texas Instruments Title: Physical layer aspects of multiple timing advance commands.

3GPP TSG RAN WG1 Meeting #68 R1-120486 Dresden, Germany, Feb. 6-10, 2012 Source: Alcatel-Lucent, Alcatel-Lucent Shanghai Bell Title: Power scaling for simultaneous transmissions of multiple UL channels with multiple TA groups.

3GPP TSG RAN WG1 #68 R1-120539 Feb. 6-10, 2012, Dresden, Germany Source: Qualcomm Incorporated Title: SRS operation in multiple TA offset CA.

3GPP TSG RAN WG1 #68 R1-120540 Feb. 6-10, 2012, Dresden, Germany Source: Qualcomm Incorporated Title: Power control aspects of multiple TA operation.

3GPP TSG RAN WG1 Meeting #68 R1-120915 Dresden, Germany, Feb. 6-10, 2012 Title: [Draft] LS on simultaneous transmission of PUSCH/PUCCH/SRS for multiple TA Source: Panasonic [TSG RAN WG1].

3GPP TSG RAN WG1 #68 R1-120918 Dresden, Germany, Feb. 6-10, 2012 Proposal on PUSCH/PUCCH transmissior with multiple TA LG Electronics, Panasonic, Ericsson, ST-Ericsson, Pantech, Texas Instruments.

3GPP TSG RAN WG1 #68 R1-120919 Dresden, Germany, Feb. 6-10, 2012 proposal on SRS transmission with multiple TA LG Electronics, ZTE, Pantech, CATT.

3GPP TSG RAN WG1 Meeting #68 R1-120946 Dresden, Germany, Feb. 6-10, 2012 Title: LS on simultaneous transmission of PUSCH/PUCCH/SRS for multiple TA Source: TSG RAN WG1.

Adaptive Video Coding for Mobile Wireless Networks by Benjamin Belzer, Judy Liao, John D. Villasenor, IEEE Compt. Soc. Press (1994).

3GPP TS 36.321 V10.0.0 (Dec. 2010), 3rd Generation Partnership Project; Technical Specification Group Radio Access Network; Evolved Universal Terrestrial Radio Access (E-UTRA); Medium Access Control (MAC) protocol specification (Release 10).

3GPP TSG RAN WG1 Meeting #68bis R1-121142 Jeju, Korea, Mar. 26-30, 2012 Source: Panasonic Title: SCell PRACH transmission timing.

3GPP TSG-RAN2 #73bis meeting Tdoc R2-113102 Barcelona, Spain, May 9-13, 2011 Source: MediaTek Title: Transmission of SCell RACH.

3GPP TSG-RAN WG2 Meeting #77bis R2-121130 Jeju, South Korea, Mar. 26-30, 2012 Agenda item: 7.1.2.3 Source: Qualcomm Incorporated Title: UE indication of UL timing loss for secondary TA group.

3GPP TSG RAN WG2 Meeting #77bis R2-121139 Jeju, Korea, Mar. 26-30, 2012 Source: CATT Title: RACH Configuration in STAG.

(56) References Cited

OTHER PUBLICATIONS

3GPP TSG-RAN WG2 Meeting #77bis R2-121181 Jeju, South Korea, Mar. 26-30, 2012 (Resubmission of R2-120089) Source: Nokia Siemens Networks, Nokia Corporation Title: RLM on SCells.
3GPP TSG RAN WG2 Meeting #77bis R2-121189 Jeju, Korea, Mar. 26-30, 2012 Source: New Postcom Title: Considerations on RACH failure handling on SCell.
3GPP TSG-RAN2#77bis R2-121193 Jeju, South Korea, Mar. 26-30, 2012 Source: NTT DOCOMO, Inc. Title: Radio link monitoring for SCell in Rel-11.
3GPP TS 36.321 V11.0.0 (Sep. 2012), 3rd Generation Partnership Project; Technical Specification Group Radio Access Network; Evolved Universal Terrestrial Radio Access (E-UTRA); Medium Access Control (MAC) protocol specification (Release 11).
3GPP TSG-RAN WG2 Meeting #77bis R2-121232 Mar. 26-30, 2012, Jeju, Korea, resubmission of R2-120246 Source: Panasonic Title: Issues on exceeding maximum timing difference of aggregated cells.
3GPP TS 36.321 V10.4.0 (Dec. 2011), 3rd Generation Partnership Project; Technical Specification Group Radio Access Network; Evolved Universal Terrestrial Radio Access (E-UTRA); Medium Access Control (MAC) protocol specification (Release 10).
3GPP TSG-RAN WG2 #77bis Tdoc R2-121278 Jeju, South Korea, Mar. 26-30, 2012 Title: Random Access Response in multiple TA Source: Research in Motion, UK Limited.
3GPP TSG-RAN2 #77bis Meeting Tdoc R2-121347 Jeju, Korea, Mar. 26-30, 2012 Source: MediaTek Inc. Title: Discussions on SCell RA procedure when reaching Preamble_Tran_Max.
3GPP TSG-RAN2 Meeting #77bis R2-121377 Mar. 26-30, 2012, Jeju, Korea Source: LG Electronics Inc. Title: Handling of SCell RACH Problem.
3GPP TSG-RAN WG2#77bis R2-121384 Jeju, Korea, Mar. 26-30, 2012 Source: Sharp Title: Remaining Issues of TA group handling.
3GPP TSG RAN WG2#77bis R2-121404 Jeju Island, Korea, Mar. 26-30, 2012 Source: Samsung Title: Remaining issue on random access failure for SCell.
3GPP TSG-RAN WG2 #77b R2-121409 Jeju, Korea, Mar. 26-30, 2012 Source: Acer Incorporated Title: Analysis of RA failure Handling.
3GPP TSG RAN WG2 #77 bis R2-121529 Jeju, Korea, Mar. 26-30, 2012 Source: ITRI Title: Discussion on whether to stop RA procedure when RA failure occurs.
3GPP TSG-RAN WG2 Meeting #77bis R2-121711 Jeju, Korea, Mar. 26-30, 2012 Source: Potevio Title: Random Access Failures Handling on SCells.
3GPP TSG RAN WG2 #77bis R2-121721 Mar. 26-30, 2012, Jeju, Korea Source: Intel Corporation Title: Further discussion on the open issues of RACH on SCell.
3GPP TSG-RAN WG2 Meeting #77bis R2-121799 Jeju, Korea, Mar. 26-30, 2012 Source: Fujitsu Title: Reaching Preamble_Trans_Max.
3GPP TSG-RAN2 Meeting #77bis R2-121869 Jeju, Korea, Mar. 26-30, 2012 Source: Ericsson Title: Introduction of CA Enhancements in MAC.
3GPP TSG RAN WG2 Meeting #78, R2-123022 Prague, Czech Republic, May 25, 2011, Title: Introduction of Carrier Aggregation enhancements.
European Final Rejection—EP Appl. 13702187.9—dated Nov. 28, 2016.
"MAC Downlink Signalling for Multiple TA"; Nokia Siemens Network et al: 3GPP Draft; R2-115747 Downlink Signalling for Multiple TA, 3rd Generation Partnership Project (3GPP), Mobile Competence Centre ; 650, Route Des Lucioles ; F-06921 Sophia-Antipolis Cedex; France, vol. RAN WG2, No. San Francisco, USA; Nov. 14, 2011-Nov. 18, 2011, Nov. 7, 2011 (Nov. 7, 2011), XP050564143.
3GPP TS 36.331 V9.10.0 (Mar. 2012), 3rd Generation Partnership Project; Technical Specification Group Radio Access Network; Evolved Universal Terrestrial Radio Access (E-UTRA); Radio Resource Control (RRC); Protocol specification (Release 9).

Sep. 19, 2017—European Search Report—EP 17153540.4.
Mar. 28, 2018—European Office Action—EP 13703256.1.
3GPP TSG RAN WG2 Meeting #80 R2-125578 New Orleans, USA, Nov. 12-Nov. 16, 2012 Source: CATT Title: Multi-TA Capability.
3GPP TSG RAN WG2 Meeting #77bis R2-124764 Bratislava, Slovakia, Oct. 8-12, 2012 Source: CATT Title: Consideration on Multi-TA Capability.
3GPP TSG-RAN WG2 Meeting #77bis R2-121456 Jeju, Korea, Mar. 26-30, 2012 Source: Huawei, HiSilicon Title: Parallel transmission in the same TAG.
Apr. 20, 2018—European Search Report—EP 17189302.7.
Feb. 8, 2019—European Office Action—EP 15165499.3.
3GPP TSG RAN WG2 #76, R2-115743 San Francisco, USA, Nov. 14-18, 2011, Title: Random Access Response on an SCell.
3GPP TSG RAN WG1 Meeting #67, R1-113721, Nov. 14-18, 2011, San Francisco, USA Source: CATT Title: Simultaneous transmission of multiple uplink channels in LTE-A Rel-11.
3GPP TSG-RAN WG1 Meeting #66bis, R1-113115, Oct. 10-14, 2011, Zhuhai, China Source: Panasonic Title: Uplink signaling for carrier aggregation enhancement.
3GPP TSG RAN WG1 Meeting #67 R1-114069, Nov. 14-18, 2011, San Francisco, USA Source: NTT DOCOMO Title: Views on CSI Reporting for Rel-11 Carrier Aggregation.
3GPP TSG RAN WG1 Meeting #67 R1-114086, Nov. 14-18, 2011, San Francisco, USA Source: Huawei, HiSilicon Title: Simultaneous transmission of SRS and PUCCH.
Jun. 1, 2020—European Office Action—EP 17189302.7.
Jul. 7, 2020—European Office Action—EP 15165499.3.
3GPP TS 36.211 V10.0.0 (Dec. 2010), 3rd Generation Partnership Project; Technical Specification Group Radio Access Network; Evolved Universal Terrestrial Radio Access (E-UTRA); Physical channels and modulation (Release 10).
3GPP TS 36.213 V10.0.0 (Dec. 2010), 3rd Generation Partnership Project; Technical Specification Group Radio Access Network; Evolved Universal Terrestrial Radio Access (E-UTRA); Physical layer procedures (Release 10).
3GPP TS 36.300 V10.2.0 (Dec. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).
3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10).
3GPP TSG-RAN WG2 Meeting #74 R2-112806 May 9-13, 2011, Barcelona, Spain Source: Panasonic Title: RACH on SCell for supporting Multiple Timing Advance.
3GPP TSG RAN WG2 Meeting #74 R2-112815 Barcelona, Spain, May 9-13, 2011 Source: CATT Title: RA Procedure for Multi-TA.
3GPP TSG-RAN WG2 Meeting #74 R2-112876 Barcelona, Spain, May 9-13, 2011 Source: ZTE Title: Group Model in Multiple TA.
3GPP TSG RAN WG2 #74 R2-112878 Barcelona, Spain, May 9-13, 2011 Source: ZTE Title: Potential PHY Impact of RACH on SCell for MTA.
3GPP TSG RAN WG2 Meeting #74 R2-112925 Barcelona, Spain, May 9-13, 2011 Source: New Postcom Title: Analysis of PCell change on single and multiple TA scenarios.
3GPP TSG-RAN WG2#74 R2-113050 Barcelona, Spain, May 9-13, 2011 Source: Sharp Title: Considerations for RACH initiation on SCell.
3GPP TSG-RAN WG2 meeting #74 R2-113063 Barcelona, Spain, May 9-13, 2011 Source: Qualcomm Incorporated Title: Consideration on multiple TA.
3GPP TSG-RAN WG2 Meeting #74 R2-113067 Barcelona, Spain, May 9-13, 2011 Source: Potevio Title: Random Access on SCell for Supporting Multi-TA.
3GPP TSG-RAN2 #73bis meeting Tdoc R2-113101 Barcelona, Spain, May 9-13, 2011 Source: MediaTek Title: Grouping of multi-TA.

(56) References Cited

OTHER PUBLICATIONS

3GPP TSG-RAN2#74 meeting R2-113124 Barcelona, Spain, May 9-13, 2011 Source: Samsung Title: Further discussions of Issues with Multiple-TA.
3GPP TSG RAN WG2 #74 R2-113192 Barcelona, Spain, May 9-13, 2011 Source: ITRI Title: Considerations on Random Access on SCell.
3GPP TSG RAN2#74 meeting R2-113215 Barcelona, Spain, May 9-13, 2011 Source: Intel Corporation Title: Configuration of multiple TA in Rel-11 CA.
TSG-RAN WG2#74 R2-113235 May 9-13, 2011, Barcelona, Spain Title: Initiating timing alignment for SCell in multiple TA Source: Alcatel-Lucent, Alcatel-Lucent Shanghai Bell.
3GPP TSG-RAN WG2#74 R2-113241 May 9-13, 2011, Barcelona, Spain Source: Motorola Mobility Title: Considerations for Supporting Multiple Timing Advances.
3GPP TSG-RAN WG2 #74 Tdoc R2-113255 Barcelona, Spain, May 9-13, 2011 Source: InterDigital Communications Title: Support for multiple Timing Advance in LTE CA.
3GPP TSG RAN WG2 Meeting #76, R2-115791 San Francisco, USA, Nov. 14-18, 2011 Source: CATT Title: Signaling for TAG configuration.
3GPP TSG-RAN WG2 Meeting #74 R2-113014 Barcelona, Spain, May 9-13, 2011 Source: Renesas Mobile Europe Title: Multiple timing advance using multiple RACH.
3GPP TSG-RAN WG2 Meeting #75bis R2-115181 Zhuhai, China, Oct. 10-14, 2011 Source: Nokia Siemens Networks, Nokia Corporation Title: TA group configuration and reconfiguration.
3GPP TSG-RAN WG2 Meeting #72bis, Tdoc R2-110356 Dublin, Ireland, Jan. 17-21, 2011 Source: ITRI Title: RF Receiver Information in UE Capability Signalling.
3GPP TSG RAN WG2 Meeting #77bis R2-121140 Jeju, Korea, Mar. 26-30, 2012 Source: CATT Title: Consideration on Multi-TA Capability.
3GPP TSG-RAN WG2 Meeting #76 R2-115757 San Francisco, USA, Nov. 14-18, 2011 R2-114939 Source: Nokia Siemens Networks, Nokia Corporation Title: MAC Downlink Signalling for Multiple TA.
3GPP TSG-RAN WG2 #74 Tdoc R2-113258 Barcelona, Spain, May 9-13, 2011 Source: InterDigital Communications Title: Support for RACH on SCells in LTE CA.
3GPP TSG RAN WG1 Meeting #67 R1-113727 San Francisco, USA, Nov. 14-18, 2011 Source: CATT Title: Support of multiple timing advances in LTE-A Rel-11 with CA.
3GPP TSG RAN WG1 Meeting #67 R1-113961 San Francisco, USA, Nov. 14-18, 2011 Title: RACH Procedure tor Multiple Timing Advances Source: Research In Motion, UK Limited.
3GPP TSG RAN WG1 #67 R1-113975 San Francisco, USA, Nov. 14-18, 2011 Source: LG Electronics Title: RAN1 issues in supporting multiple timing advances.
3GPP TSG RAN WG2 Meeting #76 R2-115789 San Francisco, USA, Nov. 14-18, 2011 Source: CATT Title: CBRA on SCell.
3GPP TSG-RAN WG2 Meeting #76 R2-115804 San Francisco, USA, Nov. 14-18, 2011 Source: Nokia Siemens Networks, Nokia Corporation Title: RA procedure on SCell.
3GPP TSG-RAN WG2 Meeting #76 R2-115817 San Francisco, USA, Nov. 14-18, 2011 Source: Potevio Title: Considerations on CBRA on SCell and Msg2 for SCell RA.
3GPP TSG-RAN WG2 Meeting #76 R2-116310 San Francisco, USA, Nov. 14-18, 2011 Source: Fujitsu Title: Remaining issues on SCell RA procedure.
3GPP TSG-RAN WG2 Meeting #77 R2-120076 Dresden, Germany, Feb. 6-10, 2012 Source: ASUSTeK Title: Further consideration on timing reference for STAG.
3GPP TSG-RAN WG2 Meeting #77 R2-120086 Dresden, Germany, Feb. 6-10, 2012 Source: Nokia Siemens Networks, Nokia Corporation Title: Timing Reference for sTAG.
3GPP TSG-RAN WG2 Meeting #77 R2-120087 Dresden, Germany, Feb. 6-10, 2012 Source: NSN Title: [Draft] LS on timing reference for STAG.
3GPP TSG-RAN WG2 Meeting #77 R2-120088 Dresden, Germany, Feb. 6-10, 2012 Source: Nokia Siemens Networks, Nokia Corporation Title: Pathloss Reference for STAG.
3GPP TSG-RAN WG2 Meeting #77 R2-120127 Dresden, Germany, Feb. 6-10, 2012 Source: Renesas Mobile Europe Title: Further analysis on timing reference for STAG.
3GPP TSG-RAN WG2 Meeting #77 Tdoc R2-120166 Feb. 6-10, 2012, Dresden, Germany Source: ITRI Title: Deactivation of DL Timing Reference in STAG.
3GPP TSG RAN WG2 #77 R2-120168 Dresden, Germany, Feb. 6-10, 2012 Source: ITRI Title: Consideration on FFS of pathloss reference configuration.
3GPP TSG-RAN2 #77 meeting Tdoc R2-120221 Dresden, Germany, Feb. 6-10, 2012 Source: MediaTek Title: Discussion on timing reference in STAG.
3GPP TSG RAN WG2 Meeting #77 R2-120252 Dresden, Germany, Feb. 6-10, 2012 Source: CATT Title: Timing Reference Change.
3GPP TSG-RAN WG2 #77 R2-120264 Feb. 6-10, 2012, Dresden, Germany Source: Intel Corporation Title: Remaining open issues on timing and pathloss reference for STAG.
TSG-RAN WG2#77 R2-120604 Dresden, Germany, Feb. 6-10, 2012 Title: Pathloss reference for SCell TA group and need of RLM Source: Alcatel-Lucent, Alcatel-Lucent Shanghai Bell.
TSG-RAN WG2#77 R2-120605 Feb. 6-10, 2012, Dresden, Germany Title: Timing reference for SCell TA group Source: Alcatel-Lucent, Alcatel-Lucent Shanghai Bell.
3GPP TSG RAN WG2 Meeting #77 R2-120799 Dresden, Germany, Feb. 6-10, 2012 Source: CATT Title: Timing Reference Change.
3GPP TSG-RAN WG2 #77 R2-120821 Feb. 6-10, 2012, Dresden, Germany Source: Intel Corporation Title: Remaining open issues on timing and pathloss reference for STAG.
3GPP TSG-RAN WG2 meeting #77bis R2-121178 Jeju, South Korea, Mar. 26-30, 2012 Source: Qualcomm Incorporated Title: Timing reference cell for secondary TA group.
3GPP TSG-RAN WG2 Meeting #77bis R2-121182 Jeju, South Korea, Mar. 26-30, 2012 (Resubmission of R2-120088) Source: Nokia Siemens Networks, Nokia Corporation Title: Pathloss Reference for STAG.
3GPP TSG RAN WG2 Meeting #77bis R2-121192 Jeju, Korea, Mar. 26-30, 2012 Source: New Postcom Title: Pathloss reference and RLM on SCell.
3GPP TSG-RAN WG2 Meeting #76, R2-115758 San Francisco, USA, Nov. 14-18, 2011; Source: ZTE, Title: "Pathloss and DL timing reference for MTA".
3GPP TSG-RAN WG2 Meeting #72, R2-106856, Jacksonville, USA; Nov. 15-19, 2010; Source: Rapporteur (Samsung), Title: "Introduction of Carrier Aggregation and UL/ DL MIMO".
3GPP TS 36.321, V10.4.0, Dec. 20, 2011 "3rd Generation Partnership Project; Technical Specification Group Radio Access Network; Evolved Universal Terrestrial Radio Access (E-UTRA); Medium Access Control (MAC) protocol specification (Release 10)",3GPP Standard.
Jan. 11, 2022—European Search Report—EP 21191532.7.
3GPP TSG-RAN2 Meeting #77bis, R2-121899, Jeju, Korea, Mar. 26-30, 2012 Change Request 36.300.
3GPP TSG RAN WG1 #68bis, R1-121425 Jeju, Korea, Mar. 26-30, 2012 Source: LG Electronics Title: SRS transmissions in multiple TA.
3GPP TSG-RAN WG1 Meeting #68 R1-120712 Dresden, Germany, Feb. 6-10, 2012 Source: Nokia Siemens Networks, Nokia Title: On Multiple Timing Advance in RAN1.
3GPP TSG RAN WG2 Meeting #76 R2-115738 San Francisco, USA, Nov. 14-18, 2011 Source: New Postcom Title: Considerations on TA group (re)configuration.
3GPP TSG-RAN WG2 Meeting #76 R2-115756 Nov. 4-18, 2011, San Francisco, USA Source: ZTE Title: TA Group management.
3GPP TSG-RAN WG2 Meeting #76 R2-115805 San Francisco, USA, Nov. 14-18, 2011 Source: Nokia Siemens Networks, Nokia Corporation Title: TA group signalling.
3GPP TSG-RAN WG2 Meeting #76 R2-115827 San Francisco, USA, Nov. 14-18, 2011 Source: Huawei, HiSilicon Title: Signalling for the TA Group Management.

(56) References Cited

OTHER PUBLICATIONS

3GPP TSG-RAN2#76 meeting Tdoc R2-116340 San Francisco. USA, Nov. 14-18, 2011, Source: HTC Title: TA group configuration and reconfiguration.
3GPP TSG RAN WG2 Meeting #77 R2-120266 Feb. 6-10, 2012, Dresden, Germany Source: Intel Corporation Title: DA Signaling Enhancements for HetNet Type Deployments.
3GPP TSG RAN WG2 Meeting #77 R2-120731 Dresden, Germany, Feb. 6-10, 2012 Source: Fujitsu Title: Further consideration on the TAG change procedure.
3GPP TSG-RAN2 Meeting #77bis R2-121233 Jeju, Korea, Mar. 26-30, 2012 Source: Panasonic Title: TAG Composition and related aspects.
3GPP TSG RAN WG2 Meeting #77bis R2-121798 Jeju, Korea, Mar. 26-30, 2012 Source: Fujitsu Title: Further consideration on the TAG change procedure.
3GPP TSG RAN WG2 Meeting #78 R2-122173 Prague, Czech Republic, May 21-25, 2012 Source: CATT Title: Detail an TAG Configuration.
3GPP TSG-RAN2#78 meeting Tdoc R2-122240 May 21-25, 2012, Prague, Czech Republic Source: ZTE Corporation Title: UE capability report for MTA.
3GPP Tsg Ran WG2 Meeting #78 R2-122264 Prague, Czech Republic, May 21-25, 2012 Source: New Postcom Title: Remaining issued of TAG configuration.
3GPP TSG RAN WG2 Meeting #78 R2-122267 Prague, Czech Republic, May 21-25, 2012 Source: New Postcom Title: Considerations on remaining issues of TAG change.
3GPP TSG-RAN WG2 Meeting #78 R2-122313 Prague, Czech Republic, May 21-25, 2012 Source: Huawei, HiSilicon Title: TAG change procedure for the SCell.
3GPP TSG-RAN WG2 Meeting #78 R2-122385 Prague, Czech Republic, May 21-25, 2012 Source: LG Electronics Inc. Title: TAG Re-association Procedure in CA.
3GPP TSG-RAN2#78 R2-122386 Prague, Czech Republic, May 21-25, 2012 Source: NTT Docomo, Inc. Title: SCell status at TAG change.
3GPP TSG-RAN WG2#78 R2-122454 Prague, Czech Republic, May 21-25, 2012 Source: Sharp Title: Remaining issues of TA group handling.
TSG-RAN WG2#78 R2-1212738 Prague, Czech Republic, May 21-25, 2012 Title: TAG related signalling Source: Alcatel-Lucent, Alcatel-Lucent Shanghai Bell.
3GPP TSG RAN WG2 Meeting #78 R2-122852 Prague, Czech Republic, May 21-25, 2012 Source: Fujitsu Title: On the TAG change procedure.
3GPP TSG RAN WG2 Meeting #78 R2-122908 Prague, Czech, May 21-25, 2012 Source: Pantech Title: Considerations on Multiple TA capability.
3GPP TSG-RAN2 Meeting #78 R2-123022 Prague, Czech Republic, May 21-25, 2012 Change Request: 36300 CR 438 rev 1 Current version: 11.1.0 Title: Introduction of Carrier aggregation enhancements Source to WG: Rapporteur (Nokia Corporation). cited byapplicant.
3GPP TS 36.212 V10.0.0 (Dec. 2010), 3rd Generation Partnership Project; Technical Specification Group Radio Access Network; Evolved Universal Terrestrial Radio Access (E-UTRA); Multiplexing and channel coding (Release 10).
3GPP TSG RAN WG1 Meeting #66bis R1-113187 Zhuhai, China, Oct. 10-14, 2011 Source: LG Electronics Title: Discussion on Simultaneous Uplink Channel Transmission in Rel-11.
3GPP TSG RAN WG1 Meeting #66bis R1-113314 Zhuhai, China, Oct. 10-14, 2011 Source: Alcatel-Lucent, Alcatel-Lucent Shanghai Bell Title: Multiple Timing Advances for Carrier Aggregation.
3GPP TSG RAN WG1 Meeting #67 R1-113910 San Francisco, USA, Nov. 14-18, 2011 Source: LG Electronics Title: Aspect on Simultaneous Transmission of PRACH and UL Channels considering Multiple Timing Advance.
3GPP TSG RAN WG1 Meeting #67 R1-114093 San Francisco, USA, Nov. 14-18, 2011 Source: Huawei, HiSilicon Title: RACH based multiple timing advances.
3GPP TSG RAN WG1 Meeting #68bis R1-120974 Jeju, Korea, Mar. 26-30, 2012 Source: Huawei, HiSilicon Title: Consideration on simultaneous transmission for UL channels in case of MTA.
3GPP TSG-RAN WG1 #68bis R1-121020 Jeju Island, Korea, Mar. 26-30, 2012 Source: Ericsson, ST-Ericsson Title: Channel Prioritization due to Multiple TA.
3GPP TSG RAN WG1 Meeting #68 bis R1-121064 Jeju, Korea, Mar. 26-30, 2012 Source: ZTE Title: Consideration on remaining issues related to multiple TA.
3GPP TSG-RAN WG1 Meeting #68bis R1-121084 Jeju, Korea, Mar. 26-30, 2012 Source: CATT Title: UL transmission method with multiple timing advances in Rel-11.
3GPP TSG-RAN WG1 Meeting #68bis R1-121141 Jeju, Korea, Mar. 26-30, 2012 Source: Panasonic Title: UE behavior for power limitation in multiple TA.
3GPP TSG RAN WG1 #68bis R1-121426 Jeju, Korea, Mar. 26-30, 2012 Source: LG Electronics Title: Power limitation in multiple TA.
3GPP TSG RAN WG1 Meeting #68bis R1-121467 Jeju, Korea, Mar. 26-30, 2012 Source: NTT Docomo Title: UL Transmissions in Case of Power Limitation for Multiple TA.
3GPP TSG-RAN WG1 #68bis R1-121551 Jeju, Korea, Mar. 24-30, 2012 Source: Qualcomm Incorporated Title: Power control aspects of multiple TA operation.
3GPP TSG RAN WG1 #68bis R1-121896 Jeju, Korea, Mar. 26-30, 2012 Joint proposal on SRS transmission with multiple TA—full overlap case LG Electronics CATT, Pantech, Panasonic, Ericsson, ST-Ericsson.
3GPP TSG-RAN WG2 Meeting #76 R2-115755 San Francisco, U.S., Nov. 14-18, 2011 Source: ZTE Title: Discussion on RACH collide with other UL transmission.
3GPP TSG-RAN WG2 Meeting #76 R2-115882 Nov. 14-18, 2011, San Francisco, USA Source: Panasonic Title: Parallel PRACH and PUSCH/PUCCH transmission.
3GPP TSG-RAN WG2 #76 Tdoc R2-115932 San Francisco, United States, Nov. 14-18, 2011 Source: Ericsson, ST Ericsson Title: Parallel Transmission of Preamble and UL Data.
TSG-RAN WG2#76 R2-116184 Nov. 14-18, 2011, San Francisco, USA Title: Simultaneous transmissions of RACH and PUCCH/PUSCH/SRS Source: Alcatel-Lucent, Alcatel-Lucent Shanghai Bell.
3GPP TSG-RAN WG2 Meeting #76 R2-116311 San Francisco, USA, Nov. 14-18, 2011 Source: Fujitsu Title: Collision between PUCCH and SCell PRACH.
3GPP TSG-RAN WG1 #68 R1-120075 Dresden, Germany, Feb. 6-10, 2012 Source: Ericsson, ST-Ericsson Title: Power scaling due to multiple TA values. cited byapplicant.
3GPP TSG RAN WG1 Meeting #68 R1-120093 Dresden, Germany, Feb. 6-10, 2012 Source: CATT Title: UL power control with multiple timing advances in Rel-11.
3GPP TSG RAN WG1 Meeting #68 R1-120123 Dresden, Germany, Feb. 6-10, 2012 Source: Huawei, HiSilicon Title: Discussion on UL control signalling transmission with multiple TAs.
3GPP TSG-RAN WG1 Meeting #68 R1-120130 Dresden, Germany, Feb. 6-10, 2012 Source: InterDigital Communications, LLC Title: Simultaneous UL transmissions in presence of R11 Multiple TA.
3GPP TSG-RAN WG1 Meeting #68 R1-120221 Dresden, Germany, Feb. 6-10, 2012 Source: Panasonic Title: Simultaneous transmissions in multiple TA.
3GPP TSG RAN WG1 Meeting #68 R1-120286 Dresden, Germany, Feb. 6-10, 2012 Source: ZTE Title: Consideration on issues related to multiple TA.
3GPP TSG RAN WG1 Meeting #68 R1-120317 Dresden, Germany, Feb. 6-10, 2012 Source: Pantech Title: Issues on parallel transmission in multiple TA environments.
Aug. 2, 2022—EP Office Action—EP App. No. 15165499.3.
3GPP TSG RAN WG2 Meeting #77 R2-120129, Feb. 6-10, 2012, Dresden, Germany Source: Renesas Mobile Europe Title: Design of TA command for multiple timing advances.
Jul. 4, 2022—EP Search Report—EP App. No. 21193754.5.
Jul. 29, 2020—European Office Action—EP 17153540.4.

(56) References Cited

OTHER PUBLICATIONS

U.S. Appl. No. 61/554,493, Joonkui Ahn, "Method of Multiple Channel Transmission for Multiple Timing-Advance", filed Nov. 1, 2011 (Section 3.1-3.1.1, pp. 22-25) (Year: 2011).
Jun. 17, 2021—European Search Report—EP 20212147.1.
Y. Zhang and F. Chen, "Interference between Sounding Reference Signal and Random Access Preamble Based on LTE Uplink," 2009 WASE International Conference on Information Engineering, Taiyuan, China, 2009, pp. 286-289 (Year:2009).
3GPP TSG-RAN WG2 Meeting #77bis R2-121230 Mar. 26-30, 2012, Jeju, Korea (update of R2-120247) Source: Panasonic Title: Handling loss of Timing/ Pathloss Reference Cell.
3GPP TSG-RAN WG2 Meeting #77Bis R2-121241 Jeju Island, Korea, Mar. 26-30, 2012 Source: ZTE Corporation Title: Pathloss and RLM for MTA.
3GPP TSG RAN WG2 Meeting #77bis R2-121307 Jeju, South Korea, Mar. 26-30, 2012 Source: Pantech Title: Deactivation of Timing Reference Cell.
3GPP TSG-RAN2 #77bis Meeting R2-121338 Jeju, Korea, Mar. 26-30, 2012 Source: MediaTek Inc. Title: Error case for timing reference.
3GPP TSG-RAN WG2 Meeting #77bis R2-121366 Jeju, South Korea, Mar. 26-30, 2012 Source: LG Electronics Inc. Title: Handling of the Timing Reference SCell Deactivation.
3GPP TSG RAN WG2#77bis R2-121398 Jeju Island, Korea, Mar. 26-30, 2012 Source: Samsung Title: Whether to allow configurable pathloss reference in STAG?.
3GPP TSG-RAN WG2 Meeting #77bis R2-121403 Jeju, Korea, Mar. 26-30, 2012 Source: Renesas Mobile Europe Title: Discussion on error case handling of the timing reference of STAG.
3GPP TSG-RAN WG2 Meeting #77bis R2-121428 Jeju, Korea, Mar. 26-30, 2012 Source: Huawei, HiSilicon Title: Pathloss reference for STAG.
3GPP TSG-RAN WG2 Meeting #77bis R2-121493 Jeju, South Korea, Mar. 26-30, 2012 Source: New Postcom Title: Considerations on Downlink Timing reference in STAG.
3GPP TSG RAN WG2 #77 bis R2-121528 Jeju, Korea, Mar. 26-30, 2012 revised from R2-120168 Source: ITRI Title: Pathloss reference configuration.
3GPP TSG-RAN WG2 Meeting #77bis Tdoc R2-121530 Mar. 26-30, 2012, Jeju, Korea Source: ITRI Title: Deactivation of Timing Reference SCell in STAG.
3GPP TSG-RAN WG2 #77bis Tdoc R2-121557 Jeju, Korea, Mar. 26-30, 2012 Source: Ericsson Title: Summary of e-mail discussion [77#26] LTE: CA: Timing reference for SCell-only TA groups.
3GPP TSG-RAN WG2 #77bis Tdoc R2-121559 Jeju, South Korea, Mar. 26-30, 2012 Source: Ericsson, ST Ericsson Title: Timing reference for SCells.
TSG-RAN WG2#77bis R2-121690 Mar. 26-30, 2012 Jeju, Korea Title: Timing reference for SCell TA group Source: Alcatel-Lucent, Alcatel-Lucent Shanghai Bell.
3GPP TSG-RAN WG2 Meeting #77bis R2-121713 Jeju, Korea, Mar. 26-30, 2012 Source: Potevio Title: Considerations an timing reference change for STAG.
3GPP TSG RAN WG2 #77bis R2-121724 Jeju, Korea, Mar. 26-30, 2012 Source: Intel Corporation Title: Remaining Bsues on timing reference for STAG.
3GPP TSG RAN WG2 Meeting #77 R2-120732 Dresden, Germany, Feb. 6-10, 2012 Source: Fujitsu Title: Discussion on PHR for SCell in Rel-11.
3GPP TSG-RAN WG2 #77, R2-120218 Dresden, Germany, Feb. 6-10, 2012 Source: Sharp Title: TA group handling.
3GPP TSG RAN WG2 #69bis R2-102395 Beijing, China, Apr. 12-16, 2010 Source: Qualcomm Incorporated Title: UL and DL Component Carrier Linking.
3GPP TSG-RAN WG2 Meeting #75B R2-114966 Zhuhai, China, Oct. 10-14, 2011 Source: Potevio Title: Consideration on contention based random access.
3GPP TSG-RAN WG2 Meeting #75bis R2-114968 Oct. 10-14, 2011, Zhuhai, China Source: Panasonic Title: Message 2 reception in RA procedure for SCell.
3GPP TSG RAN WG2 #75bis R2-114977 Oct. 10-14, 2011, Zhuhai, China Source: Potevio Title: UE Behaviour on Multi-RA Procedures.
3GPP TSG-RAN WG2 Meeting #75bis R2-115042 Zhuhai China, Oct. 10-14, 2011 Source: Fujitsu Title: Remaining issues on SCell RA procedure.
3GPP TSG-RAN WG2 Meeting #75bis R2-115147 Zhuhai, China, Oct. 10-14, 2011 Source: Renesas Mobile Europe Ltd. Title: Open issues for RACH procedure.
3GPP TSG-RAN WG2 #75bis Tdoc R2-115156 Zhuhai, China, Oct. 10-14, 2011 Title: Random Access Response in multiple TA Source: Research in Motion, UK Limited.
3GPP TSG-RAN WG2#75bis R2-115174 Zhuhai, China, Oct. 10-14, 2011 Source: Sharp Title: A special SCell for CA enhancement.
3GPP TSG-RAN2#75bis R2-11530Z Oct. 10-14, 2011, Zhuhai, China Source: New Postcom Title: Open issues of RACH on SCell.
TSG-RAN WG2#75bis R2-115338 Oct. 10-14, 2011, Zhuhai, China Title: RACH on SCell Source: Alcatel-Lucent, Alcatel-Lucent Shanghai Bell.
3GPP TSG-RAN2 Meeting #75bis R2-115399 Oct. 10-14, 2011, Zhuhai, China Source: LG Electronics Inc. Title: RACH applicability and TA group.
3GPP TSG-RAN WG2 #75bis Tdoc R2-115409 Zhuhai, China, Oct. 10-14, 2011 Source: InterDigital Communications Title: Prioritization between RACH Procedures in LTE CA.
3GPP TS 36.213 V10.3.0 (Sep. 2011), 3rd Generation Partnership Project; Technical Specification Group Radio Access Network; Evolved Universal Terrestrial Radio Access (E-UTRA); Physical layer procedures (Release 10).
3GPP TSG-RAN WG2 #77 R2-120229, Dresden, Germany, Feb. 6-10, 2012, Source: Acer Incorporated, Title: Changing of DL Timing Reference.
3GPP TSG RAN WG2 Meeting #77bis R2-121309, Jeju, South Korea, Mar. 26-30, 2012, Source: Pantech, Title: RAR MAC CE with C-RNTI.
3GPP TSG-RAN WG2 Meeting #77bis R2-121368, Jeju, Korea, Mar. 26-30, 2012, Source: LG Electronics Inc., Title: Performing RA procedure on cell other than the timing reference cell.
3GPP TSG-RAN WG2#77bis meeting R2-121712, Jeju, Korea, Mar. 26-30, 2012, Source: Samsung, Title: Timing reference for STAG.
3GPP TSG RAN WG2 Meeting #77bis R2-121190 Jeju Island, Korea, Mar. 26-30, 2012 Source: New Postcom Title: Considerations on TAG change procedure.
3GPP TSG RAN WG2 Meeting #75-bis R2-115449 Zhuhai, China, Oct. 10-14, 2011 Source: NTT Docomo, Inc. (Email discussion rapporteur) Title: Summary of email discussion [75#33]—LTE: Carrier Aggregation scenarios and resulting requirements.
3GPP TSG-RAN WG2 #75bis Tdoc R2-115463 Zhuhai, China, Oct. 10-14, 2011 Source: Ericsson, ST Ericsson Title: SCell Random Access Prioritization.
3GPP TSG-RAN WG2 #76 Tdoc R2-115743 San Francisco, United States, Nov. 14-18, 2011 Source: Ericsson, ST Ericsson Title: Random Access Response on an SCell.
3GPP TSG-RAN WG2 Meeting #76 R2-115754 San Francisco, United States, Nov. 14-18, 2011 Source: ZTE Title: MSG2 Position for MTA RA.
3GPP TSG-RAN WG2 Meeting #76 R2-115782 San Francisco, USA, Nov. 14-18, 2011 Source: Renesas Mobile Europe Ltd. Title: RACH procedure on SCell.
3GPP TSG-RAN WG2 Meeting #76 R2-115890 Nov. 14-18, 2011, San Francisco, USA Source: HT mMobile Inc. Title: Initiating RA procedure on SCell.
3GPP TSG-RAN WG2 #76 Tdoc R2-116111 San Francisco, USA, Nov. 14-18, 2011 Source: InterDigital Communications Title: MSG1 Transmission for RACH Procedure for SCells.
3GPP TSG-RAN2 Meeting #76 R2-116225 Nov. 14-18, 2011, San Francisco, USA Source: LG Electronics Inc. Title: SCell RACH trigger.

(56) References Cited

OTHER PUBLICATIONS

3GPP TSG-RAN2 Meeting #76 R2-116228 Nov. 14-18, 2011, San Francisco, USA Source: LG Electronics Inc. Title: RACH applicability and TA group.
3GPP TSG-RAN WG2 Meeting #76 R2-16309 San Francisco, USA, Nov. 14-18, 2011 Source: Fujitsu Title: Trigger of RA procedure on SCell(s).
3GPP TSG-WG2 Meeting #76 R2-116503 San Francisco, USA, Nov. 14-18, 2011 Updates of Carrier Aggregation agreements (WI R2-111115) Rapporteur (Nokia Corporation).
3GPP TSG-RAN WG2 Meeting #73bis R2-111880 Shanghai, China, Apr. 11-15, 2011 Title: Corrections to CA related IE descriptions Source to WG: Potevio.
3GPP TSG-RAN WG1 Meeting #65 R1-111577 Barcelona, Spain, May 9-13, 2011 Source: Panasonic Title: Simultaneous SRS transmission on multiple component carriers.
3GPP TSG-RAN1 Meeting #65 R1-111893 Barcelona, Spain, May 8-13, 2011 Title: Correction to simultaneous transmission of SRS and PUCCH format 2/2a/2b Source: ZTE, Qualcomm Inc.

\* cited by examiner

COMMUNICATION DEVICE

CROSS-REFERENCE TO RELATED APPLICATIONS

This application is a continuation of U.S. patent application Ser. No. 16/731,567, filed Dec. 31, 2019, which is a continuation of U.S. patent application Ser. No. 15/870,102, filed Jan. 12, 2018, which is a continuation of:

U.S. patent application Ser. No. 14/797,082, filed Jul. 11, 2015 (now U.S. Pat. No. 9,872,280, issued Jan. 16, 2018), which is a continuation of U.S. patent application Ser. No. 13/918,987, filed Jun. 16, 2013 (now U.S. Pat. No. 9,084,228, issued Jul. 14, 2015), which claims the benefit of U.S. Provisional Application No. 61/696,115, filed Aug. 31, 2012, and U.S. Provisional Application No. 61/662,191, filed Jun. 20, 2012; and U.S. patent application Ser. No. 15/657,903, filed Jul. 24, 2017, which is a continuation of:

U.S. patent application Ser. No. 14/797,082, filed Jul. 11, 2015 (now U.S. Pat. No. 9,872,280, issued Jan. 16, 2018), which is a continuation of U.S. patent application Ser. No. 13/918,987, filed Jun. 16, 2013 (now U.S. Pat. No. 9,084,228, issued Jul. 14, 2015), which claims the benefit of U.S. Provisional Application No. 61/696,115, filed Aug. 31, 2012, and U.S. Provisional Application No. 61/662,191, filed Jun. 20, 2012; and U.S. patent application Ser. No. 14/599,494, filed Jan. 17, 2015 (now U.S. Pat. No. 9,717,061), which is a continuation of U.S. patent application Ser. No. 13/918,985, filed Jun. 16, 2013 (now U.S. Pat. No. 8,971,298), which claims the benefit of U.S. Provisional Application No. 61/696,115, filed Aug. 31, 2012, and U.S. Provisional Application No. 61/661,329, filed Jun. 18, 2012.

All of the above are hereby incorporated by reference in their entireties.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention enable operation of multiple timing advance groups. Embodiments of the technology disclosed herein may be employed in the technical field of multicarrier communication systems. More particularly, the embodiments of the technology disclosed herein may relate to operation of multiple timing advance groups in an automobile communication device.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
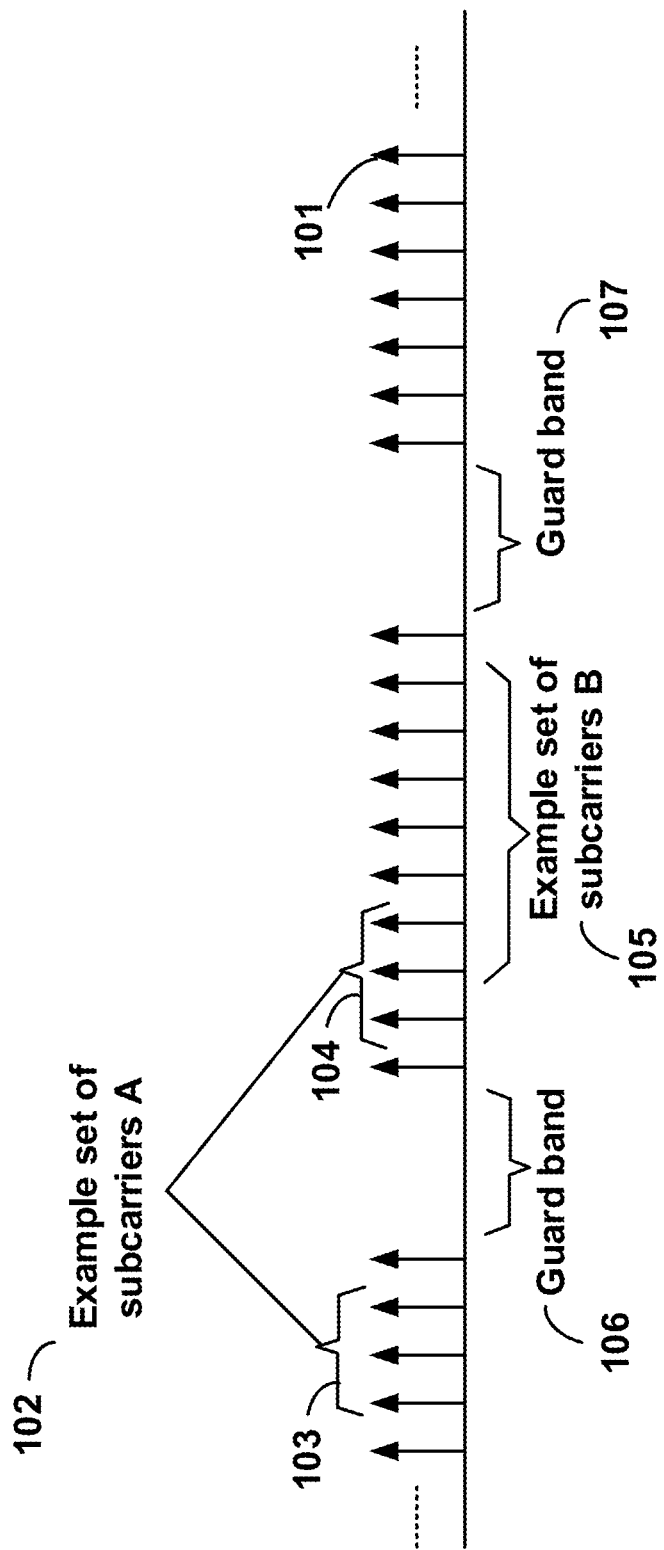
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
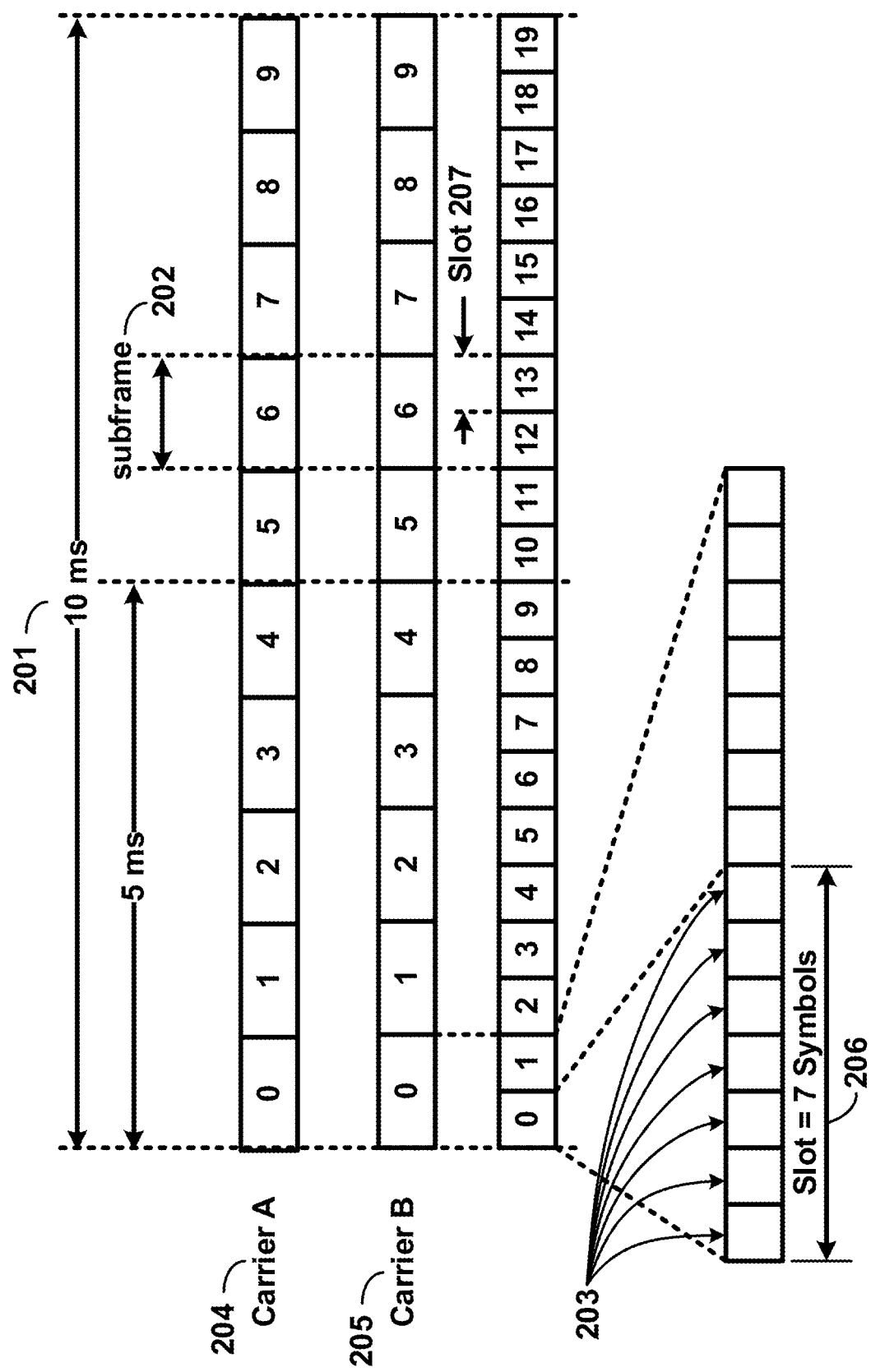
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots 206. For the example of FDD, 10 subframes may be available for downlink transmission and 10 subframes may be available for uplink transmissions in each 10 msec interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
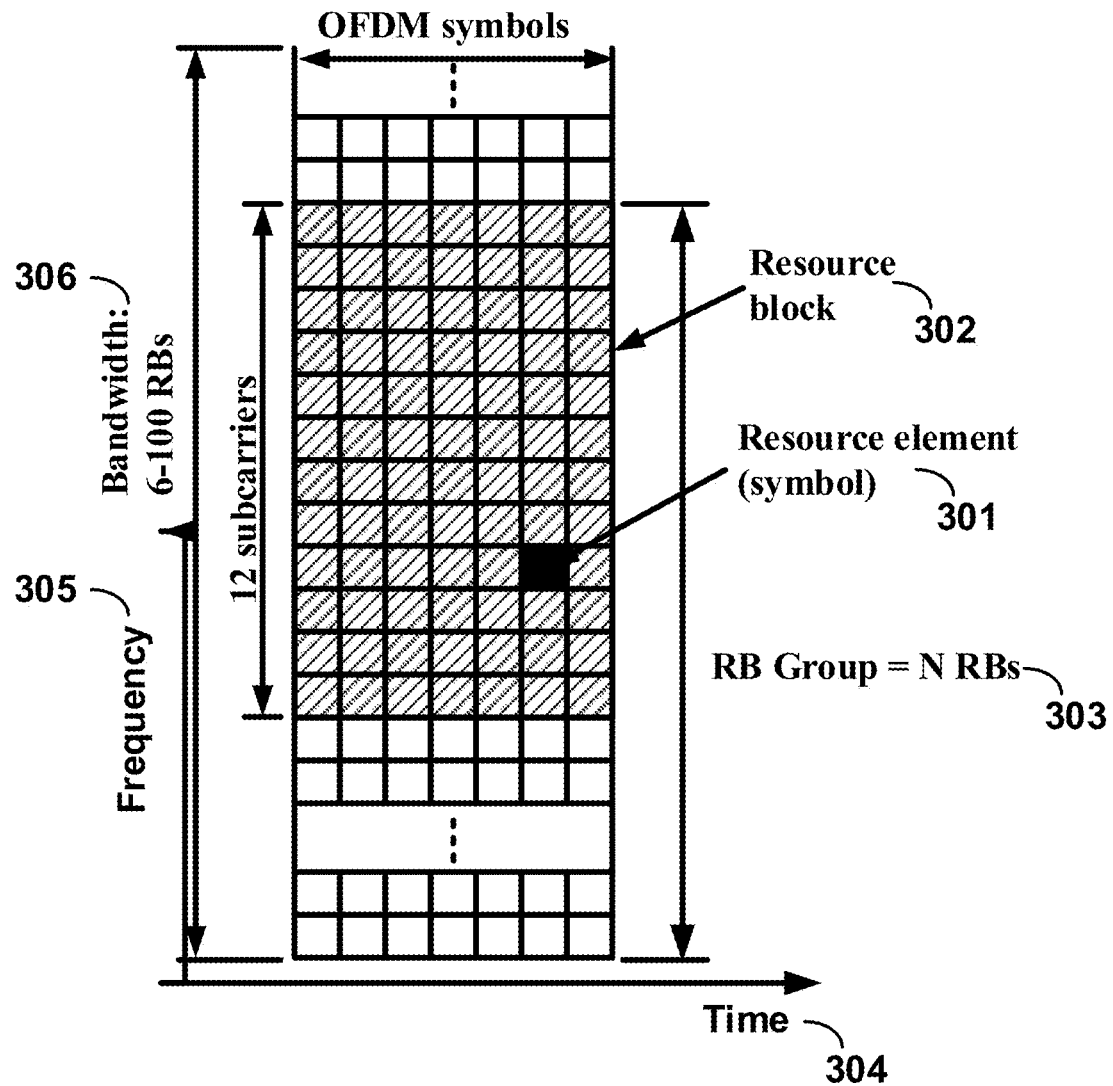
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 kHz subcarrier bandwidth and 12 subcarriers).

Figure 4:
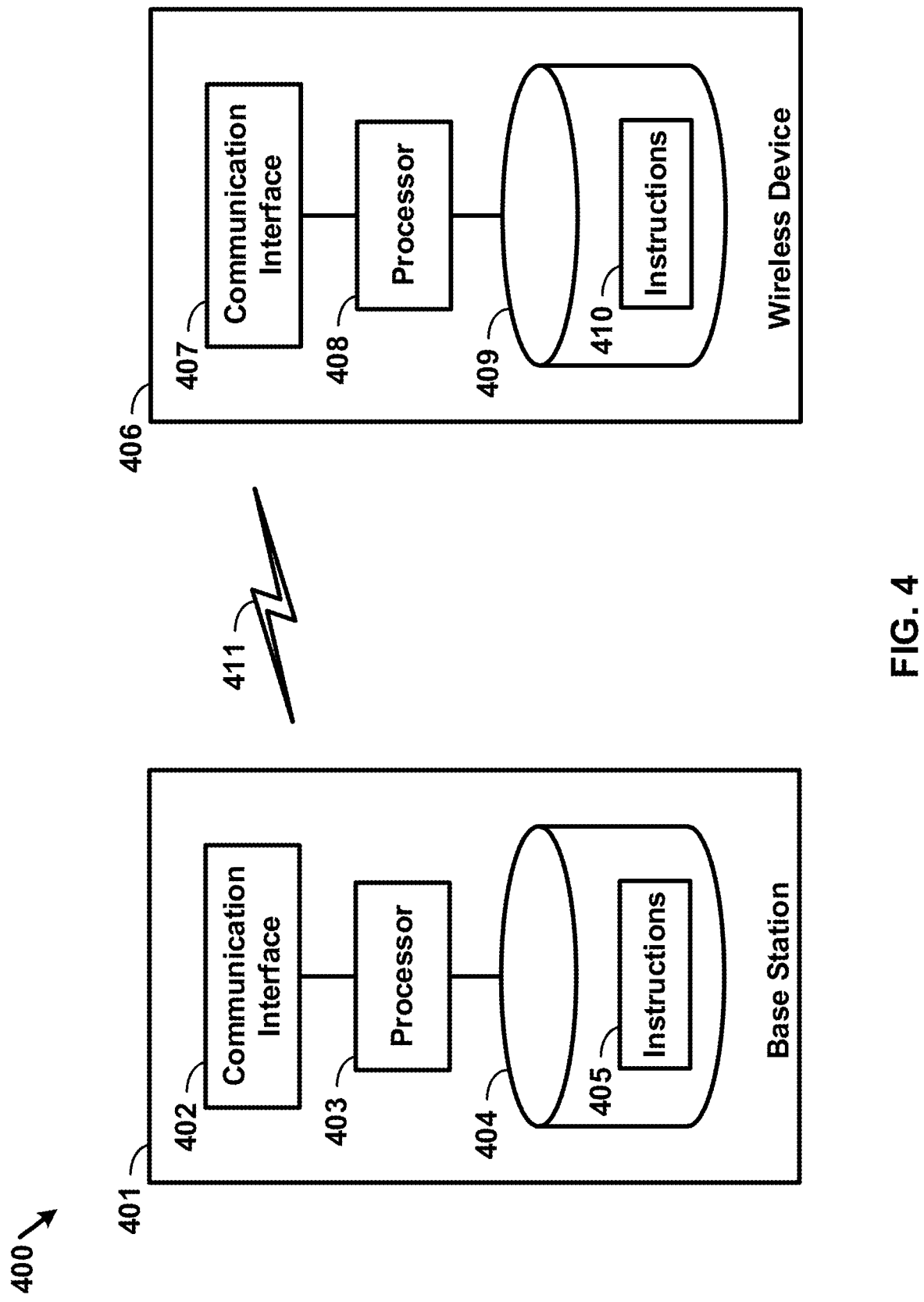
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated in FIG. 1, FIG. 2, and FIG. 3 and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Example embodiments of the invention may enable operation of multiple timing advance groups. Other example embodiments may comprise a non-transitory tangible computer readable media comprising instructions executable by one or more processors to cause operation of multiple timing advance groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multiple timing advance groups. The device may include processors, memory, interfaces, and/or the like. Other example embodiments may comprise communication networks comprising devices such as base stations, wireless devices (or user equipment: UE), servers, switches, antennas, and/or the like.

According to some of the various aspects of embodiments, serving cells having an uplink to which the same time alignment (TA) applies may be grouped in a TA group (TAG). Serving cells in one TAG may use the same timing reference. For a given TAG, a user equipment (UE) may use one downlink carrier as the timing reference at a given time. The UE may use a downlink carrier in a TAG as the timing reference for that TAG. For a given TAG, a UE may synchronize uplink subframe and frame transmission timing of the uplink carriers belonging to the same TAG. According to some of the various aspects of embodiments, serving cells having an uplink to which the same TA applies may correspond to the serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference.

Figure 5:
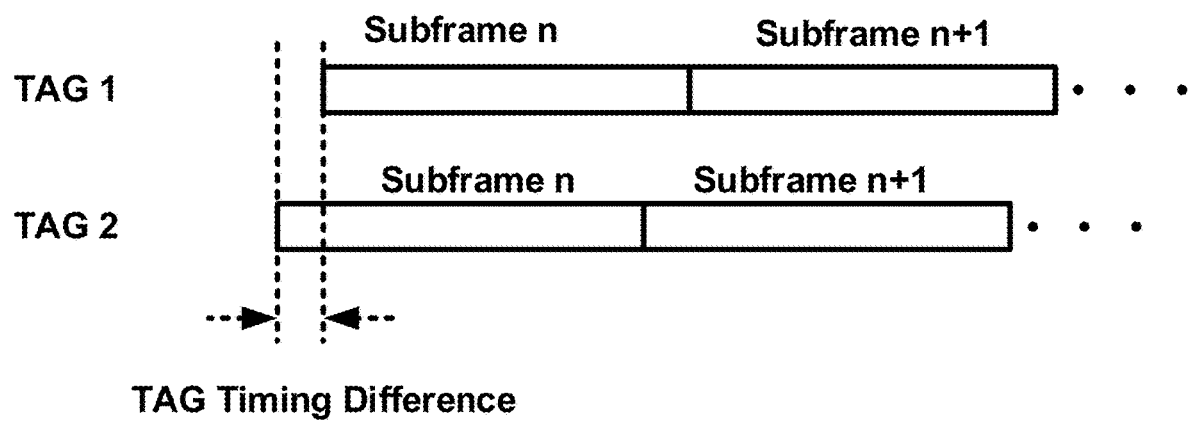
FIG. 5 is a diagram depicting uplink transmission timing of one or more cells in a first timing advance group (TAG) and a second TAG as per an aspect of an embodiment of the present invention.

FIG. 5 is a diagram depicting uplink transmission timing of one or more cells in a first timing advance group (TAG1) and a second TAG (TAG2) as per an aspect of an embodiment of the present invention. TAG1 may include one or more cells, TAG2 may also include one or more cells. TAG timing difference in FIG. 5 may be the difference in UE uplink transmission timing for uplink carriers in TAG1 and TAG2. The timing difference may range between, for example, sub micro-seconds to about 30 micro-seconds.

Figure 7:
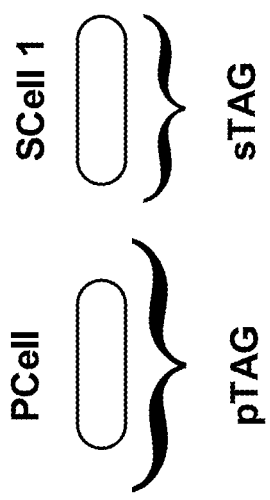
FIG. 7 shows example TAG configurations as per an aspect of an embodiment of the present invention.
Figure 7:
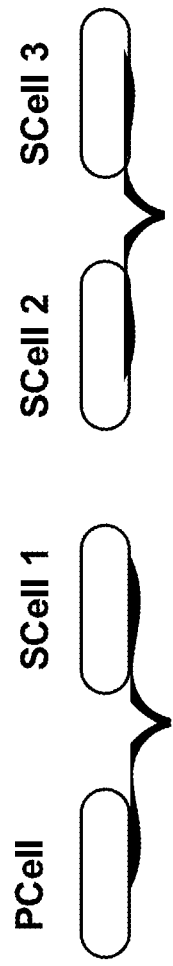
Figure 7:
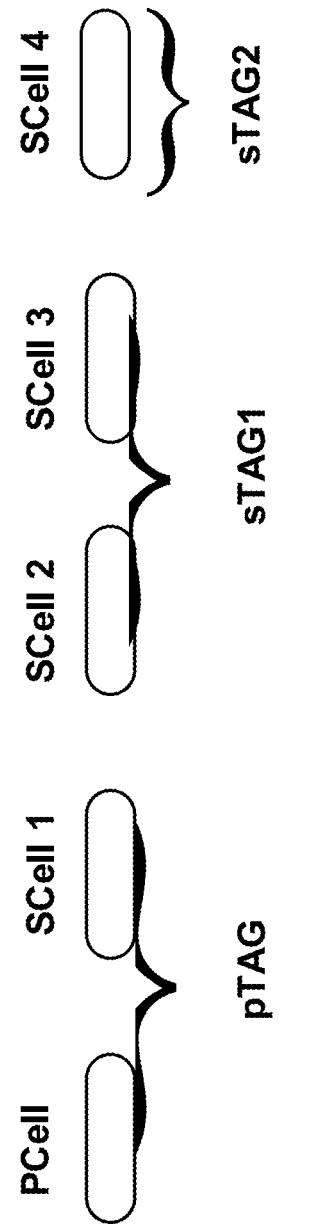

FIG. 7 shows example TAG configurations as per an aspect of an embodiment of the present invention. In Example 1, pTAG include PCell, and sTAG includes SCell1. In Example 2, pTAG includes PCell and SCell1, and sTAG includes SCell2 and SCell3. In Example 3, pTAG includes PCell and SCell1, and sTAG1 includes SCell2 and SCell3, and sTAG2 includes SCell4. Up to four TAGs may be supported and other example TAG configurations may also be provided. In many examples of this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and the timing reference for pTAG may follow LTE release 10 principles. The UE may need to measure downlink pathloss to calculate the uplink transmit power. The pathloss reference may be used for uplink power control and/or transmission of random access preamble(s). A UE may measure downlink pathloss using the signals received on the pathloss reference cell. For SCell(s) in a pTAG, the choice of pathloss reference for cells may be selected from and be limited to the following two options: a) the downlink SCell linked to an uplink SCell using the system information block 2 (SIB2), and b) the downlink PCell. The pathloss reference for SCells in pTAG may be configurable using RRC message(s) as a part of SCell initial configuration and/or reconfiguration. According to some of the various aspects of embodiments, PhysicalConfigDedicatedSCell information element (IE) of an SCell configuration may include the pathloss reference SCell (downlink carrier) for an SCell in pTAG. The downlink SCell linked to an uplink SCell using the system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. TAT for TAGs may be configured with different values. When the TAT associated with the pTAG expires: all TATs may be considered as expired, the UE may flush all HARQ buffers of all serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with sTAG expires: a) SRS transmissions may be stopped on the corresponding SCells, b) SRS RRC configuration may be released, c) CSI reporting configuration for the corresponding SCells may be maintained, and/or d) the MAC in the UE may flush the uplink HARQ buffers of the corresponding SCells.

Upon deactivation of the last SCell in an sTAG, the UE may not stop TAT of the sTAG. In an implementation, upon removal of the last SCell in an sTAG, TAT of the TA group may not be running. RA procedures in parallel may not be supported for a UE. If a new RA procedure is requested (either by UE or network) while another RA procedure is already ongoing, it may be up to the UE implementation whether to continue with the ongoing procedure or start with the new procedure. The eNB may initiate the RA procedure via a PDCCH order for an activated SCell. This PDCCH order may be sent on the scheduling cell of this SCell. When cross carrier scheduling is configured for a cell, the scheduling cell may be different than the cell that is employed for preamble transmission, and the PDCCH order may include the SCell index. At least a non-contention based RA procedure may be supported for SCell(s) assigned to sTAG(s).

Figure 6:
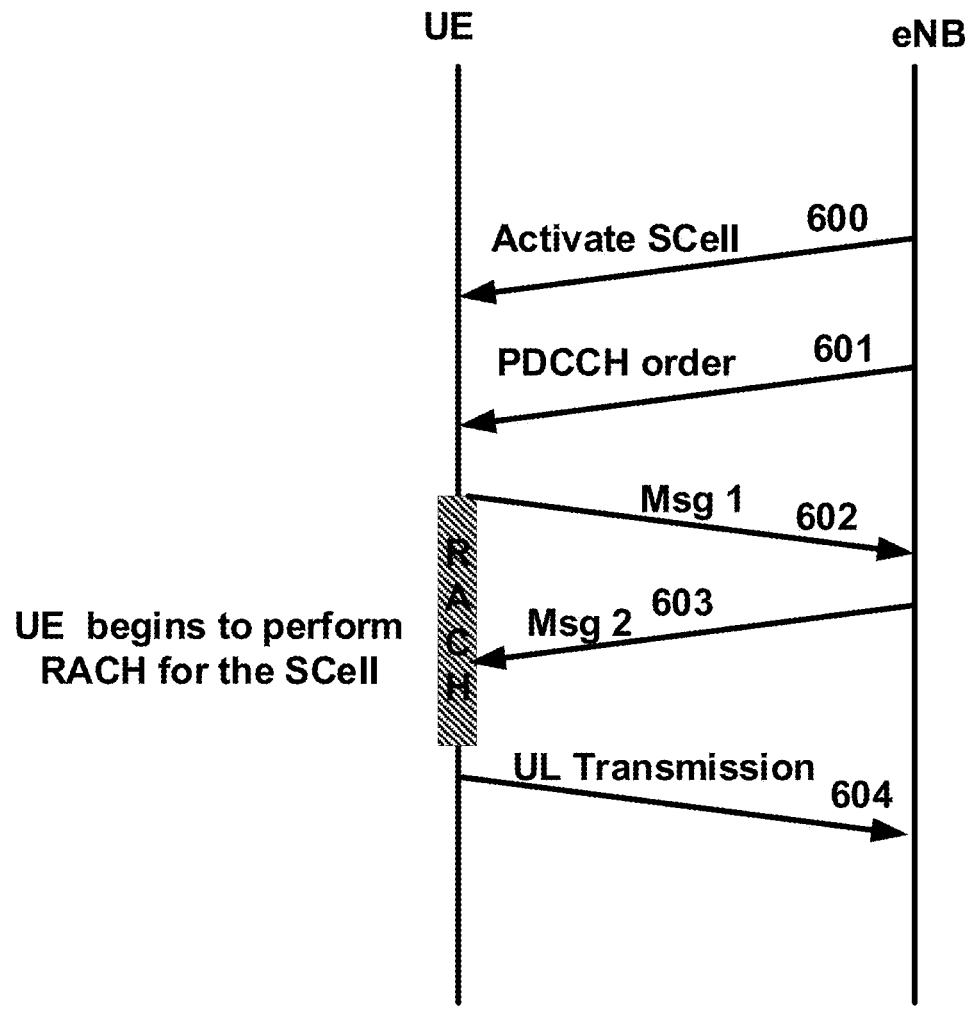
FIG. 6 is an example message flow in a random access process in a secondary TAG as per an aspect of an embodiment of the present invention.

FIG. 6 is an example message flow in a random access process in a secondary TAG as per an aspect of an embodiment of the present invention. eNB transmits an activation command 600 to activate an SCell. A preamble 602 (Msg1) may be sent by a UE in response to the PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on SCell may be addressed to RA-RNTI in PCell common search space (CSS). Uplink packets 604 may be transmitted on the SCell, in which the preamble was transmitted.

According to some of the various aspects of embodiments, initial timing alignment may be achieved through a random access procedure. This may involve the UE transmitting a random access preamble and the eNB responding with an initial TA command NTA (amount of timing advance) within the random access response window. The start of the random access preamble may be aligned with the start of the corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

A base station may communicate with a mix of wireless devices. Wireless devices may support multiple technologies, or multiple releases of the same technology, have some specific capability depending on the wireless device category and/or capability. A base station may comprise multiple sectors. When this disclosure refers to a base station communicating with a plurality of wireless devices, this disclosure may refer to a subset of the total wireless devices in the coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in the coverage area, which perform according to the disclosed methods, and/or the like. There may be many wireless devices in the coverage area that may not comply with the disclosed methods, for example, because those wireless devices perform based on older releases of LTE technology. A time alignment command MAC control element may be a unicast MAC command transmitted to a wireless device.

According to some of the various aspects of various embodiments, the base station or wireless device may group cells into a plurality of cell groups. The term "cell group" may refer to a timing advance group (TAG) or a timing alignment group or a time alignment group. Time alignment command may also be referred to timing advance command. A cell group may include at least one cell. A MAC TA command may correspond to a TAG. A cell group may explicitly or implicitly be identified by a TAG index. Cells in the same band may belong to the same cell group. A first cell's frame timing may be tied to a second cell's frame timing in a TAG. When a time alignment command is received for the TAG, the frame timing of both first cell and second cell may be adjusted. Base station(s) may provide TAG configuration information to the wireless device(s) by RRC configuration message(s).

The mapping of a serving cell to a TAG may be configured by the serving eNB with RRC signaling. The mechanism for TAG configuration and reconfiguration may be based on RRC signaling. According to some of the various aspects of embodiments, when an eNB performs SCell addition configuration, the related TAG configuration may be configured for the SCell. In an example embodiment, eNB may modify the TAG configuration of an SCell by removing (releasing) the SCell and adding (configuring) a new SCell (with the same physical cell ID and frequency) with an updated TAG ID. The new SCell with the updated TAG ID may be initially inactive subsequent to being assigned the updated TAG ID. eNB may activate the updated new SCell and then start scheduling packets on the activated SCell. In an example implementation, it may not be possible to change the TAG associated with an SCell, but rather, the SCell may need to be removed and a new SCell may need to be added with another TAG. For example if there is a need to move an SCell from an sTAG to a pTAG, at least one RRC message, for example, at least one RRC reconfiguration message, may be send to the UE to reconfigure TAG configurations by releasing the SCell and then configuring the SCell as a part of pTAG (when an SCell is added/configured without a TAG index, the SCell is explicitly assigned to pTAG). The PCell may not change its TA group and may always be a member of the pTAG.

An eNB may perform initial configuration based on initial configuration parameters received from a network node (for example a management platform), an initial eNB configuration, a UE location, a UE type, UE CSI feedback, UE uplink transmissions (for example, data, SRS, and/or the like), a combination of the above, and/or the like. For example, initial configuration may be based on UE channel state measurements or received signal timing. For example, depending on the signal strength received from a UE on various SCells downlink carrier or by determination of UE being in a repeater coverage area, or a combination of both, an eNB may determine the initial configuration of sTAGs and membership of SCells to sTAGs.

In an example implementation, the TA value of a serving cell may change, for example due to UE's mobility from a macro-cell to a repeater or an RRH (remote radio head)

coverage area. The signal delay for that SCell may become different from the original value and different from other serving cells in the same TAG. In this scenario, eNB may reconfigure this TA-changed serving cell to another existing TAG. Or alternatively, the eNB may create a new TAG for the SCell based on the updated TA value. The TA value may be derived, for example, through eNB measurement(s) of signal reception timing, a RA mechanism, or other standard or proprietary processes. An eNB may realize that the TA value of a serving cell is no longer consistent with its current TAG. There may be many other scenarios which require eNB to reconfigure TAGs. During reconfiguration, the eNB may need to move the reference SCell belonging to an sTAG to another TAG. In this scenario, the sTAG would require a new reference SCell. In an example embodiment, the UE may select an active SCell in the sTAG as the reference timing SCell.

eNB may consider UE's capability in configuring multiple TAGs for a UE. UE may be configured with a configuration that is compatible with UE capability. Multiple TAG capability may be an optional feature and per band combination Multiple TAG capability may be introduced. UE may transmit its multiple TAG capability to eNB via an RRC message and eNB may consider UE capability in configuring TAG configuration(s).

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

The parameters related to SCell random access channel may be common to all UEs. For example, PRACH configuration (RACH resources, configuration parameters, RAR window) for the SCell may be common to UEs. RACH resource parameters may include prach-configuration index, and/or prach-frequency offset. SCell RACH common configuration parameters may also include power: power ramping parameter(s) for preamble transmission; and max number of preamble transmission parameter. It is more efficient to use common parameters for RACH configuration, since different UEs will share the same random access channel.

eNB may transmit at least one RRC message to configure PCell, SCell(s) and RACH, and TAG configuration parameters. MAC-MainConfig may include a timeAlignmentTimerDedicated IE to indicate time alignment timer value for the pTAG. MAC-MainConfig may further include an IE including a sequence of at least one (sTAG ID, and TAT value) to configure time alignment timer values for sTAGs. In an example, a first RRC message may configure TAT value for pTAG, a second RRC message may configure TAT value for sTAG1, and a third RRC message may configure TAT value for sTAG2. There is no need to include all the TAT configurations in a single RRC message. In an example embodiment they may be included in one or two RRC messages. The IE including a sequence of at least one (sTAG ID, and TAT) value may also be used to update the TAT value of an existing sTAG to an updated TAT value. The at least one RRC message may also include sCellToAddModList including at least one SCell configuration parameters. The radioResourceConfigDedicatedSCell (dedicated radio configuration IEs) in sCellToAddModList may include an SCell MAC configuration comprising TAG ID for the corresponding SCell added or modified. The radioResourceConfigDedicatedSCell may also include pathloss reference configuration for an SCell. If TAG ID is not included in SCell configuration, the SCell is assigned to the pTAG. In other word, a TAG ID may not be included in radioResourceConfigDedicatedSCell for SCells assigned to pTAG. The radioResourceConfigCommonSCell (common radio configuration IEs) in sCellToAddModList may include RACH resource configuration parameters, preamble transmission power control parameters, and other preamble transmission parameter(s). At the least one RRC message configures PCell, SCell, RACH resources, and/or SRS transmissions and may assign each SCell to a TAG (implicitly for pTAG or explicitly for sTAG). PCell is always assigned to the pTAG.

According to some of the various aspects of embodiments, a base station may transmit at least one control message to a wireless device in a plurality of wireless devices. The at least one control message is for example, RRC connection reconfiguration message, RRC connection establishment message, RRC connection re-establishment message, and/or other control messages configuring or reconfiguring radio interface, and/or the like. The at least one control message may be configured to cause, in the wireless device, configuration of at least: I) a plurality of cells. Each cell may comprise a downlink carrier and zero or one uplink carrier. The configuration may assign a cell group index to a cell in the plurality of cells. The cell group index may identify one of a plurality of cell groups. A cell group in the plurality of cell groups may comprise a subset of the plurality of cells. The subset may comprise a reference cell with a reference downlink carrier and a reference uplink carrier. Uplink transmissions by the wireless device in the cell group may employ the reference cell (the primary cell in pTAG and a secondary cell in an sTAG). The wireless device may employ a synchronization signal transmitted on the reference downlink carrier as timing reference to determine a timing of the uplink transmissions. The synchronization signal for example may be a) primary/secondary synchronization signal, b) reference signal(s), and/or c) a combination of a) and b). II) a time alignment timer for each cell group in the plurality of cell groups; and/or III) an activation timer for each configured secondary cell.

The base station may transmit a plurality of timing advance commands. Each timing advance command may comprise: a time adjustment value, and a cell group index. A time alignment timer may start or may restart when the wireless device receives a timing advance command to adjust uplink transmission timing on a cell group identified by the cell group index. A cell group may be considered out-of-sync, by the wireless device, when the associated time alignment timer expires or is not running. The cell group may be considered in-sync when the associated time alignment timer is running.

The timing advance command may causes substantial alignment of reception timing of uplink signals in frames and subframes of all activated uplink carriers in the cell group at the base station. The time alignment timer value may be configured as one of a finite set of predetermined values. For example, the finite set of predetermined values may be eight. Each time alignment timer value may be encoded employing three bits. TAG TAT may be a dedicated time alignment timer value and is transmitted by the base station to the wireless device. TAG TAT may be configured to cause configuration of time alignment timer value for each time alignment group. The IE TAG TAT may be used to control how long the UE is considered uplink time aligned. It corresponds to the timer for time alignment for each cell group. Its value may be in number of subframes. For example, value sf500 corresponds to 500 subframes, sf750 corresponds to 750 subframes and so on. An uplink time alignment is common for all serving cells belonging to the same cell group. In an example embodiment, the IE TAG TAT may be defined as: TAG TAT::=SEQUENCE{TAG ID, ENUMERATED {sf500, sf750, sf1280, sf1920, sf2560, sf5120, sf10240, infinity}}. Time alignment timer for pTAG may be indicated in a separate IE and may not be included in the sequence.

In an example, TimeAlignmentTimerDedicated IE may be sf500, and then TAG TAT may be {1, sf500; 2, sf2560; 3, sf500}. In the example, time alignment timer for the pTAG is configured separately and is not included in the sequence. In the examples, TAG0 (pTAG) time alignment timer value is 500 subframes (500 msec), TAG1 (sTAG) time alignment timer value is 500 subframes, TAG2 time alignment timer value is 2560 subframes, and TAGS time alignment timer value is 500 subframes. This is for example purposes only. In this example a TAG may take one of 8 predefined values. In a different embodiment, the enumerated values could take other values.

Configuration of multiple carrier groups may provide many benefits in the communication between an application server and a wireless device via a base station. Multiple carrier groups may provide flexibility in employing multiple carriers in multiple bands or in a single band. Full configuration and activation of carriers in multiple carrier groups may increase the processing load on the wireless device and increase battery power consumption in the wireless device. Therefore, there may be a need to develop a mechanism that takes advantages of multiple carrier group configurations while reducing signaling overhead, processing load and battery power consumption in the wireless device. Battery power consumption, processing load and signaling overhead may increase if all the carrier groups are configured, activated and uplink synchronized before communication starts. Solutions provided in example embodiments may: reduce processing requirements in the wireless device; reduce signaling overhead; and reduce battery power consumption in the wireless device.

Figure 8:
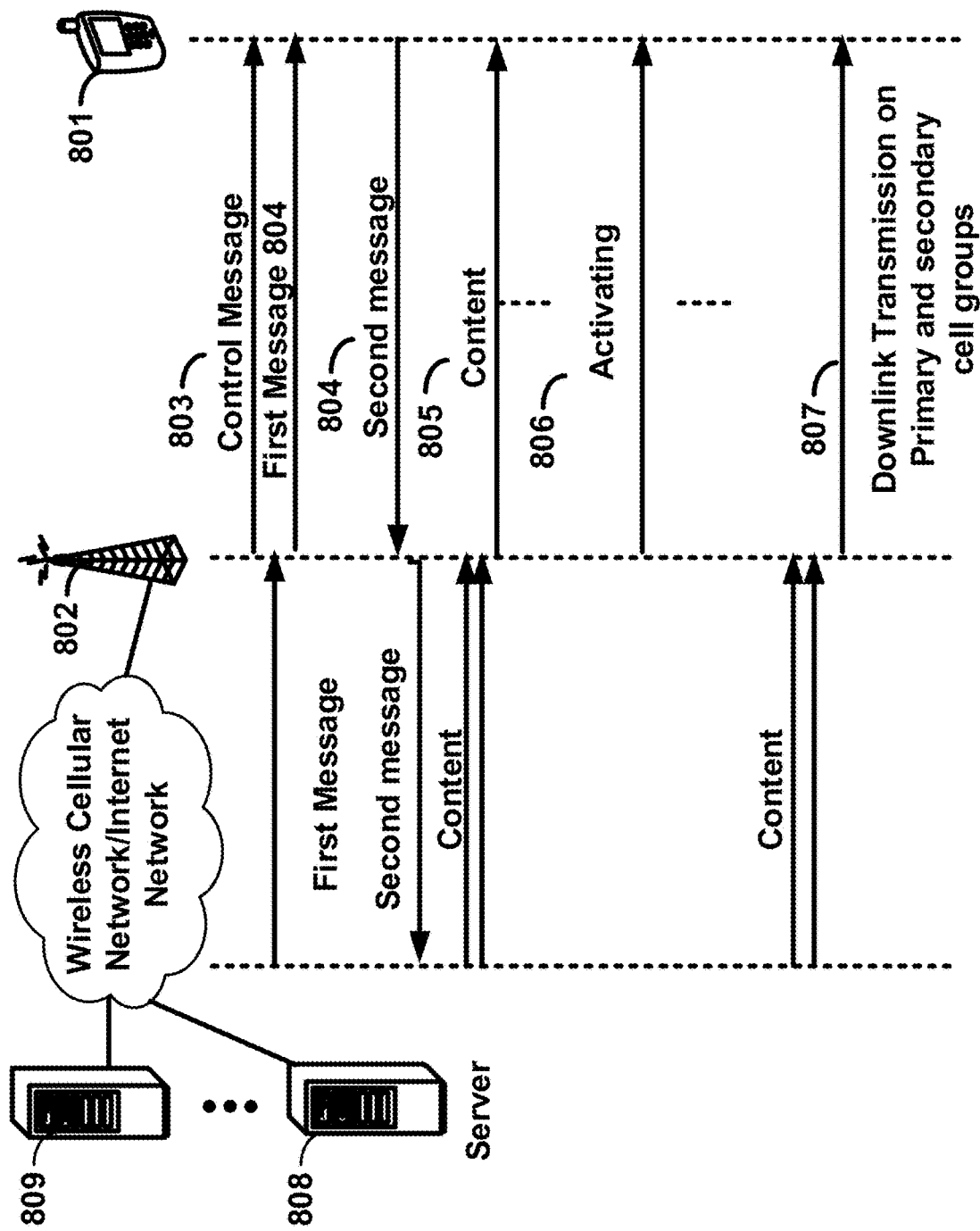
FIG. 8 depicts an example message flow between a base station, a wireless device and one or more servers as per an aspect of an embodiment of the present invention.

FIG. 8 depicts an example message flow between a base station, a wireless device and one or more servers as per an aspect of an embodiment of the present invention. According to some of the various aspects of embodiments, a base station 802 may transmit to a wireless device 801 at least one control message configured to cause in the wireless device configuration of a plurality of cells at 803. The plurality of cells may comprise a primary cell and at least one secondary cell. The at least one control message may be configured to cause in the wireless device assignment of each of the at least one secondary cell to a cell group in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell. Uplink transmissions by the wireless device in the primary cell group may employ a first synchronization signal transmitted on the primary cell as a primary timing reference. Uplink transmissions in the secondary cell group may employ a second synchronization signal on an activated secondary cell in the secondary cell group as a secondary timing reference.

The base station 802 may transmit, to the wireless device 801 over the primary cell group, a first message comprising a content descriptor at 804. The first message may originate from an application server 808-809 in a communication network. The server may comprise a group of servers, a server farm, a cloud computing platform, distributed servers, and/or the like. The content descriptor may describe content residing on the application server. The first message may be transmitted over one or more cells of the primary cell group, for example, may be transmitted on a primary cell. The base station does not need to activate cells in the secondary cell group for transmission of the first message. The content descriptor may, for example, be the title of a video clip, a hyper link to a web page, a name of an image, or a file name for an email attachment, and/or the like. The tasks provided in the example embodiments may be applicable when the wireless device is not running other applications and is not transmitting or receiving major traffic in the uplink or downlink, except the traffic to the application server described in the specification. If multiple applications (that generates uplink or downlink traffic) are executed on the wireless device, then the tasks described here may be executed by other applications and may not apply to this process.

The base station may receive, from the wireless device over the primary cell group, a second message addressed to the application server. The second message may request the content. In an example embodiment, the request may trigger downloading a page, a video, an attachment file, and/or the like. For example, the first message may be a title of a video clip in youtube, and the second message may be the message generated by the user tapping on the video clip, which may start downloading and playing of the video clip.

The base station may transmit to the wireless device over the primary cell group an activation command activating one or more secondary cells in the secondary cell group at 806. The base station may also transmit to the wireless device over the primary cell group a first plurality of content packets comprising a first portion of the content originating from the server at 805. No content traffic may be transmitted on the secondary cell group until activation of cells in the secondary cell group.

The base station may transmit to the wireless device over the primary cell group and the secondary cell group, a second plurality of content packets comprising a second portion of the content at 807. Cells in the secondary cell group are activated selectively by the base station for transmission of the second portion of the traffic. In another example embodiment, the base station may not transmit the first portion on the primary cell group and start transmitting content packets after some of the cells in both primary and secondary cell groups are activated.

According to some of the various aspects of a second embodiment, a base station may transmit, to a wireless device, at least one first control message configured to cause configuration of a primary cell group comprising at least one first cell. In an example embodiment, configuration of only one cell group (primary cell group) may apply that no cell groups may be configured in the wireless device. When no cell group parameters are configured in the wireless device, all configured cells (primary cell and zero or more secondary cells) in the wireless device may employ the primary cell as the timing reference. The base station may transmit to a wireless device over the primary cell group, a first message comprising a content descriptor. The first message may be originated from an application server in a communication network. The content descriptor may describe content residing on the application server. The base station may receive, from the wireless device over the primary cell group, a second message addressed to the server. The second message may request the content.

The base station may transmit to the wireless device over the primary cell group at least one second control message configured to cause configuration of a secondary cell group comprising at least one secondary cell. A plurality of cell group may be configured in the wireless device including a primary cell group and a secondary cell group. The base station may selectively configure a secondary cell group to employ secondary cells in the secondary cell group for packet transmission and increase the data rate used for transmission of content packets to the wireless device. The base station may transmit to the wireless device over the primary cell group an activation command activating one or more secondary cells in the secondary cell group. The base station may transmit to the wireless device over the primary cell group a first plurality of content packets comprising a first portion of the content originating from the application server.

According to some of the various aspects of embodiments, the base station may transmit to the wireless device a control command initiating an uplink timing synchronization process for the secondary cell group. The base station may transmit to the wireless device over the primary cell group and the secondary cell group, a second plurality of content packets comprising a second portion of the content. Configuration and activation of the secondary cell group enable to transmit downlink traffic employing cells in both primary and secondary groups and increase downlink data rate for transmission of content packets. In the example embodiments, the first portion of the content may be transmitted in a first time period. The second portion of the content may be transmitted in a second time period. The first time period and the second time period may not overlap. The first time period may precede the second time period.

Packets in the first plurality of content packets and the second plurality of content packets may be encrypted packets. The first message, the second message, the first portion of the content, and the second portion of the content may be transmitted over the same radio bearer. The configuration may further assign a first secondary cell in the at least one secondary cell with a deactivation timer. The deactivation timer may restart in response to a packet transmission on the first secondary cell. The first secondary cell may deactivate in the wireless device in response to the deactivation timer expiring. The activation command may be transmitted to the wireless device without encryption. In an example embodiment, the secondary cell group may be out-of-sync when the second plurality of content packets are transmitted over the primary cell group and the secondary cell group. The base station may not need to initiate uplink synchronization process for the second cell group for downlink transmission of content packets.

Figure 9:
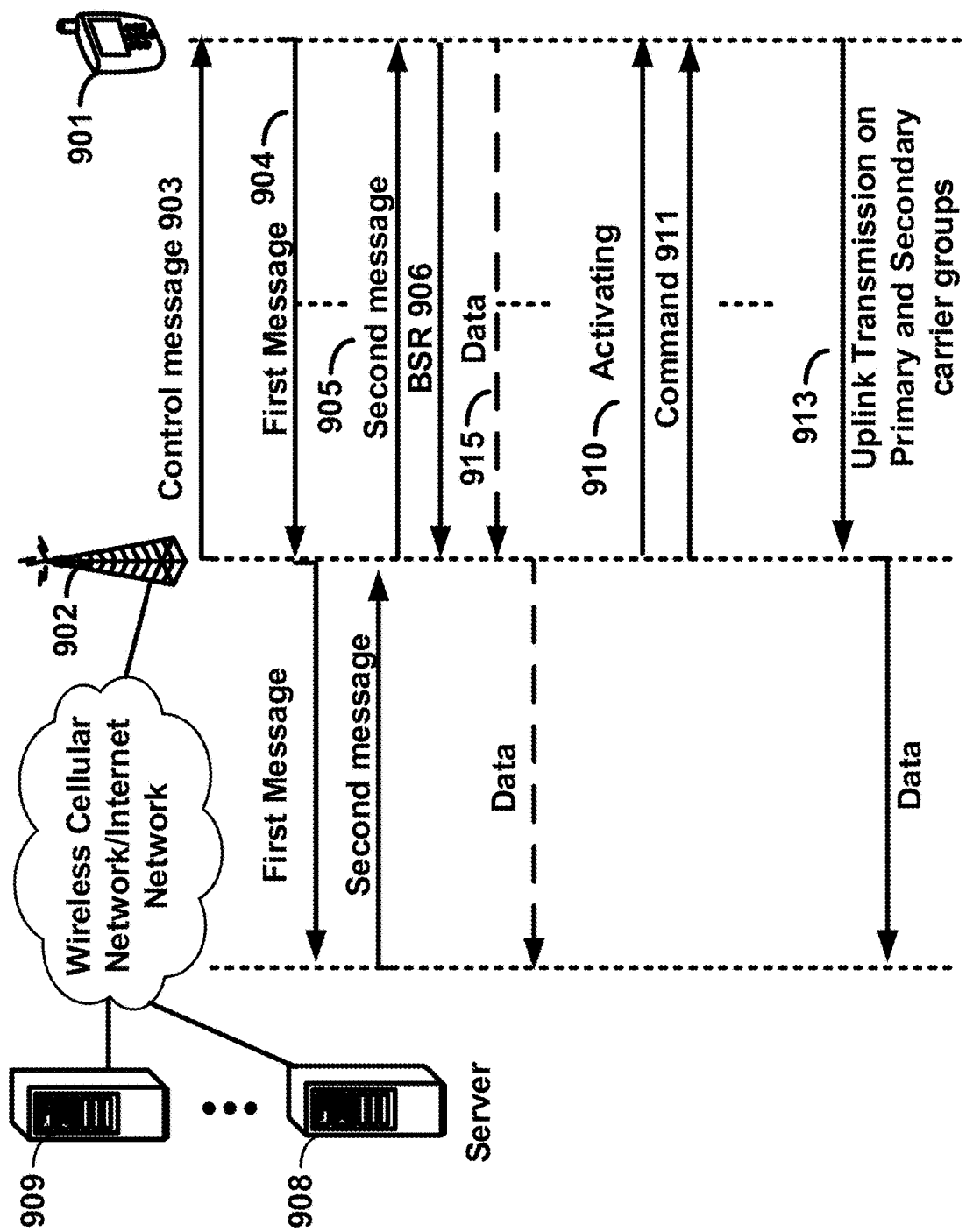
FIG. 9 depicts an example message flow between a base station, a wireless device, and one or more servers as per an aspect of an embodiment of the present invention.

FIG. 9 depicts an example message flow between a base station, a wireless device, and one or more servers as per an aspect of an embodiment of the present invention. A wireless device 901 may receive from a base station 902, at least one first control message configured to cause in the wireless device configuration of a plurality of cells comprising a primary cell and at least one secondary cell at 903. The at least one first control message may be configured to further cause in the wireless device assignment of each of the at least one secondary cell to a cell group in a plurality of cell groups. The plurality of cell groups may comprise a primary cell group and a secondary cell group. The primary cell group may comprise a first subset of the plurality of cells.

The first subset may comprise the primary cell. The secondary cell group may comprise a second subset of the at least one secondary cell.

The wireless device 901 may transmit to the base station 902 over the primary cell group, a first message addressed to an application server 908-909. The first message may be a request message to establish a connection. In an example embodiment, the wireless device may be a camera sending a first message to upload an image. In another example embodiment, the first message may be generated during an upload process for uploading a file, sending an image, movie clip, or any other content data. The first message is transmitted to the application server and initiates the process for uploading content.

The wireless device may receive from the base station over the primary cell group, a second message originating from the application server at 905. The second message may respond to the first message. The second message may comprise an acknowledgement for a received packet. The second message may comprise information about configuration parameters of the application server. The server responds to the wireless device with a second message. In another example embodiment, there may be multiple communications between the wireless device and application server(s) before content transmission starts. The communications is performed over the primary cell.

The wireless device may transmit, to the base station over the primary cell group, a second control message comprising the size of a buffer storing a first portion of a content data at 906. The base station may use the size of the buffer to selectively activate secondary cells in the secondary cell group. The wireless device may transmit, to the base station over the primary cell group a first plurality of content packets addressed to the application server at 915. In another embodiment, the wireless device may not transmit content packets until cells in the secondary cell group are active. The wireless device may receive from the base station on the primary cell group a message activating one or more secondary cells in the secondary cell group at 910. The wireless device may receive from the base station, a third control message originating from the base station at 911. The third control message may initiate an uplink timing synchronization process for the secondary cell group. The third base station may be a PDCCH order for transmission of a random access preamble on a secondary cell in the secondary cell group. After the secondary cell group is uplink synchronized. The wireless device may transmit, to the base station over the primary cell group and the secondary cell group, a plurality of content packets addressed to the application server at 913. The plurality of content packets may comprise a subset of the first portion of the content. In this process, cell(s) in the secondary cell group are activated and uplink synchronized as needed, and this may reduce battery power consumption in the wireless device.

In a second example embodiment, a wireless device may receive from a base station, at least one first control message to cause configuration or a primary cell and zero or more secondary cells. Only primary cell group comprising at least one first cell 903 is configured. Configuration of only one cell group may imply that no cell groups are configured and the wireless device may employ the primary cell as timing reference of all configured cell(s).

The wireless device may transmit to the base station over the primary cell group a first message addressed to an application server over the primary cell group at 904. The wireless device may receive a second message 905 in response to transmission of the first message. The wireless device may transmit a second control message comprising the size of a buffer storing a first portion of a content stored in the wireless device or in a peripheral of the wireless device. The wireless device may receive from the base station over the primary cell group, at least one third control message to cause configuration of a secondary cell group comprising at least one secondary cell (this message is not shown in FIG. 9). The base station may selectively and in response to reception of the buffer status report (the size of the buffer) transmit the at least one third message configuring the secondary cell group. The wireless device may then receive an activation command causing activation of one or more secondary cells in the secondary cell group at 910. The wireless device may receive from the base station, a fourth control message to initiate an uplink timing synchronization process for the secondary cell group. The wireless device may transmit to the base station over the primary cell group and the secondary cell group, a plurality of content packets addressed to the application server. In this process, cell(s) in the secondary cell group are configured, activated, and uplink synchronized as needed, and this may reduce battery power consumption in the wireless device.

The wireless device may receive from the base station over a cell in the primary cell group, an activation command to activate one or more secondary cells in the secondary cell group. The activation command may be transmitted before transmission of the third control message. The activation command may be received from the base station without encryption. The first message may be a request message to establish a connection. The second message may comprise an acknowledgement for a received packet. The second message may comprise information about configuration parameters of the application server. The plurality of content packets may be encrypted by the wireless device. The third control message may be a PDCCH order comprising a mask index and a random access preamble identifier.

Figure 10:
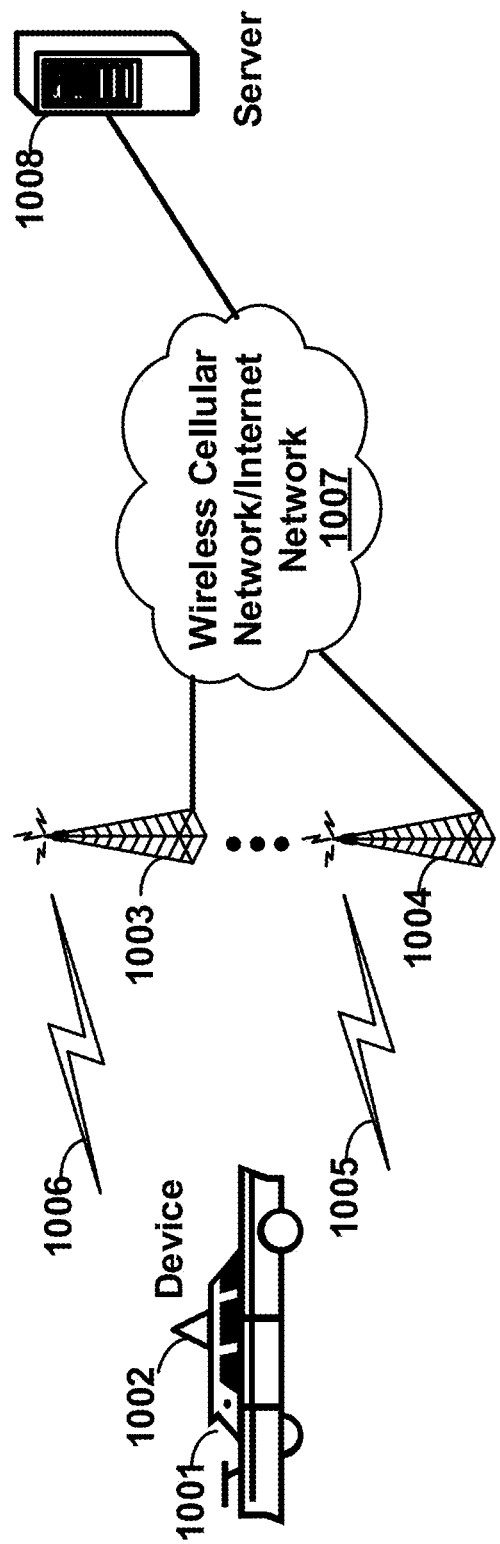
FIG. 10 is a block diagram of system for transmitting automobile data over a multicarrier OFDM radio as per an aspect of an embodiment of the present invention.

FIG. 10 is a simplified block diagram depicting a system for communication between an automobile communication device 1002 installed in an automobile 1001 and a server 1008 over a multicarrier OFDM radio according to one aspect of the illustrative embodiments. As shown, the system includes at its core a Wireless Cellular Network/Internet Network 1007, which may function to provide connectivity between one or more automobile communication devices 1002, and one or more servers 1008, such as multimedia server, application servers, email servers, database servers, another user's computer, a smartphone, and/or the like.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. For example, the functions of the server may be implemented in multiple servers or in a server farm. Still further, various functions described herein as being performed by one or more entities may be carried out by hardware, firmware and/or software logic. For instance, various functions may be carried out by a processor executing a set of machine language instructions stored in memory.

As shown, the access network may include a plurality of base stations 1003-1004. Each base station 1003-1004 of the access network may function to transmit and receive RF radiation 1005-1006 at one or more carrier frequencies, and the RF radiation may then provide one or more air interfaces over which the automobile communication device 1002 may communicate with the base stations 1003-1004. The automobile 1001 may use the automobile communication device to receive and transmit data and control information from the base station or the server. The automobile communication device 1002 may include applications to enable the functions described in the example embodiments. In another example embodiment, the automobile communication device 1002 may automatically transmit and/or receive traffic to a server 1008 without direct involvement of a user.

Each of the one or more base stations 1003-1004 may define a corresponding wireless coverage area. The RF radiation 1005-1006 of the base stations 1003-1004 may carry communications between the Wireless Cellular Network/Internet Network 1007 and access device 1002 according to any of a variety of protocols. For example, RF radiation 1005-1006 may carry communications according to WiMAX (e.g., IEEE 802.16), LTE, microwave, satellite, MMDS, Wi-Fi (e.g., IEEE 802.11), Bluetooth, infrared, and other protocols now known or later developed. The communication between the automobile communication device 1002 and the server 1008 may be enabled by any networking and transport technology for example TCP/IP, RTP, RTCP, HTTP or any other networking protocol.

An automobile communication device may be installed or integrated in an automobile to facilitate communication between various automobile peripherals/components and application servers. It is envisioned that automobiles may include advanced systems employing remote applications and servers to enhance features available to the automobile driver/passengers, provide many capabilities to driver/passengers, enhance safety, and/or the like. For example, the console or other devices may allow the automobile occupants to run various types of applications such as navigation, entertainment, driving aid applications, support applications, search applications, monitoring applications, games, video calls, and/or the like. These types of applications may require connection to a remote server or computers in Internet. Such connections may be feasible employing the automobile communication device. For example, an automobile display device in the back seat may be capable to communicate with a remote server and run advanced applications, such as IPTV, Video on Demand, audio and/or video streaming, gaming applications, driving related tools, automobile diagnostic tools, road guidance applications, video calls, and/or the like. In another example, the automobiles may be empowered by advanced control, safety, monitoring, and/or the like applications that may require access to Internet and may require a connection to remote servers/computers. These applications may require access to Internet for upgrades or may communicate with other communication servers/computers/phones to communicate employing data packets. These features may require a fast and reliable communication link to external servers/computers and may be feasible employing wireless technologies. There is a need to implement mechanisms employing advanced wireless systems to enable such systems while reducing processing load, battery power consumption and signaling overhead.

Figure 11:
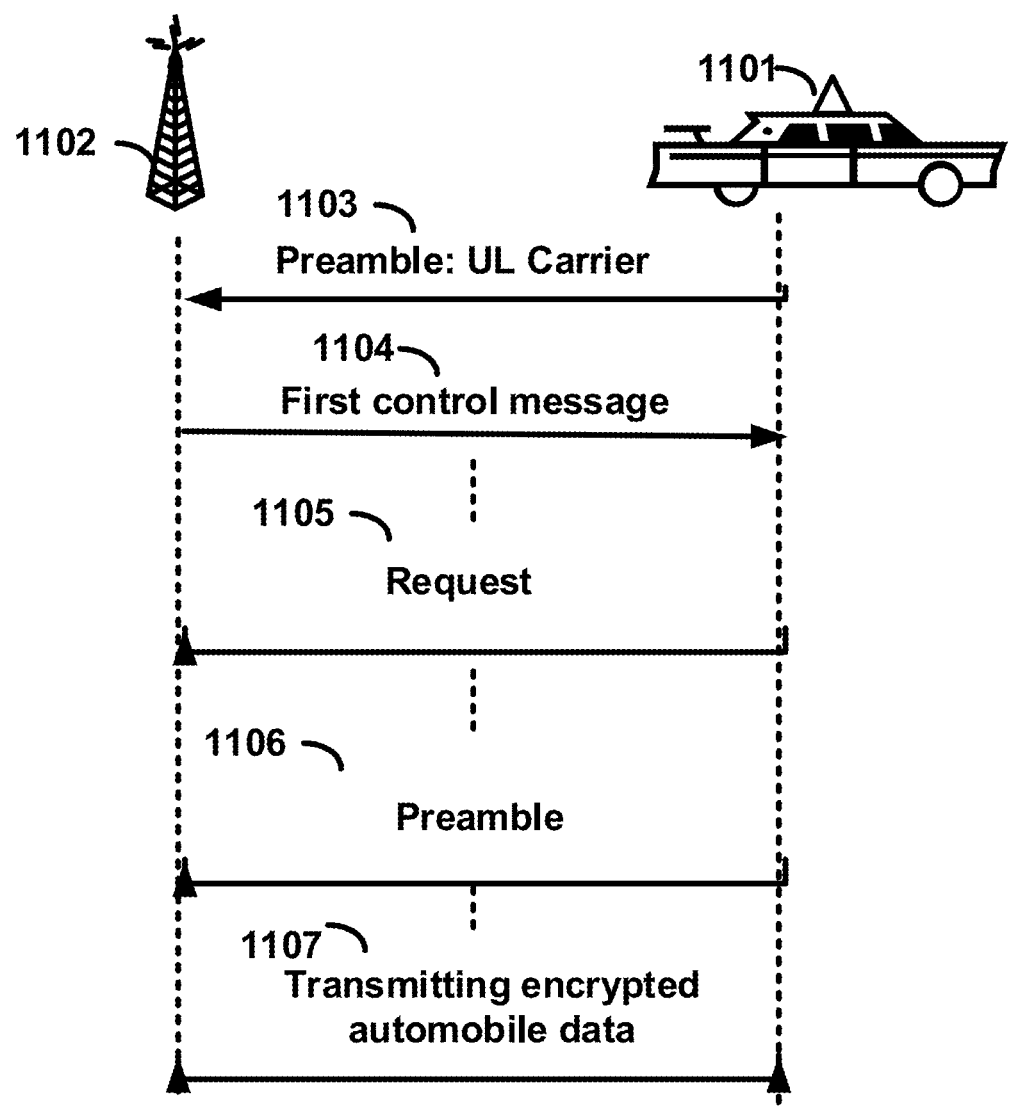
FIG. 11 depicts example message flows between a base station and an automobile device as per an aspect of an embodiment of the present invention.

FIG. 11 depicts example message flows between a base station and an automobile device as per an aspect of an embodiment of the present invention. According to some of the various aspects of embodiments, an automobile communication device 1101 may receive at least one first message from one of a plurality of peripheral devices installed in an automobile. The at least one message may trigger a request configured to be transmitted to at least one application server in a communication network. The at least one message may be generated in response to an automobile user input to the one of the plurality of peripheral devices. In another example, the at least one message may be generated when a pre-defined condition is met. The pre-defined condition is met, for example, when an application on at least one of the automobile processors requires connection to a server.

The automobile communication device 1101 may transmit a first random access preamble 1103 to a base station 1102 over a primary cell of a plurality of cells in response to receiving the at least one message. This may start a random access process to obtain uplink timing and resources for transmission of an RRC connection request. The automobile communication device may receive, at least one first control message from the base station at 1104. The at least one first control message may be configured to cause configuration of the plurality of cells. The plurality of cells may comprise the primary cell and at least one secondary cell. The configuration may assign each secondary cell to a cell group identified by a cell group index. The cell group index may identify one of a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell.

The automobile communication device may transmit the request to the base station at 1104. In an example, the request may be transmitted over the primary cell group. The request may be destined to the application server. The automobile communication device may receive from the base station, a first plurality of packets over the primary cell group from the base station. The first plurality of packets may be originated from the application server. The automobile communication device may transmit to the base station, a second random access preamble on the secondary cell group at 1106. The second random access preamble may start timing synchronization of the second cell group. After the synchronization process is completed, the automobile communication device may receive from the base station, a second plurality of packets over the primary cell group and the secondary cell group. The automobile communication device may forward the first plurality of packets and the second plurality of packets to the one of the plurality of peripheral devices. In this example embodiment both primary and secondary cell groups may be configured and activated for transmission of automobile data. This process may provide higher data rate for communication between the automobile communication device and the base station. In another example embodiment, the automobile communication device may not transmit the second preamble and receive automobile data on the primary and secondary cell groups, while the secondary cell group is un-synchronized. This process may also be used for uploading data to the application server. The data may include any type of data generated by any of the peripherals devices installed in the automobile.

Figure 12:
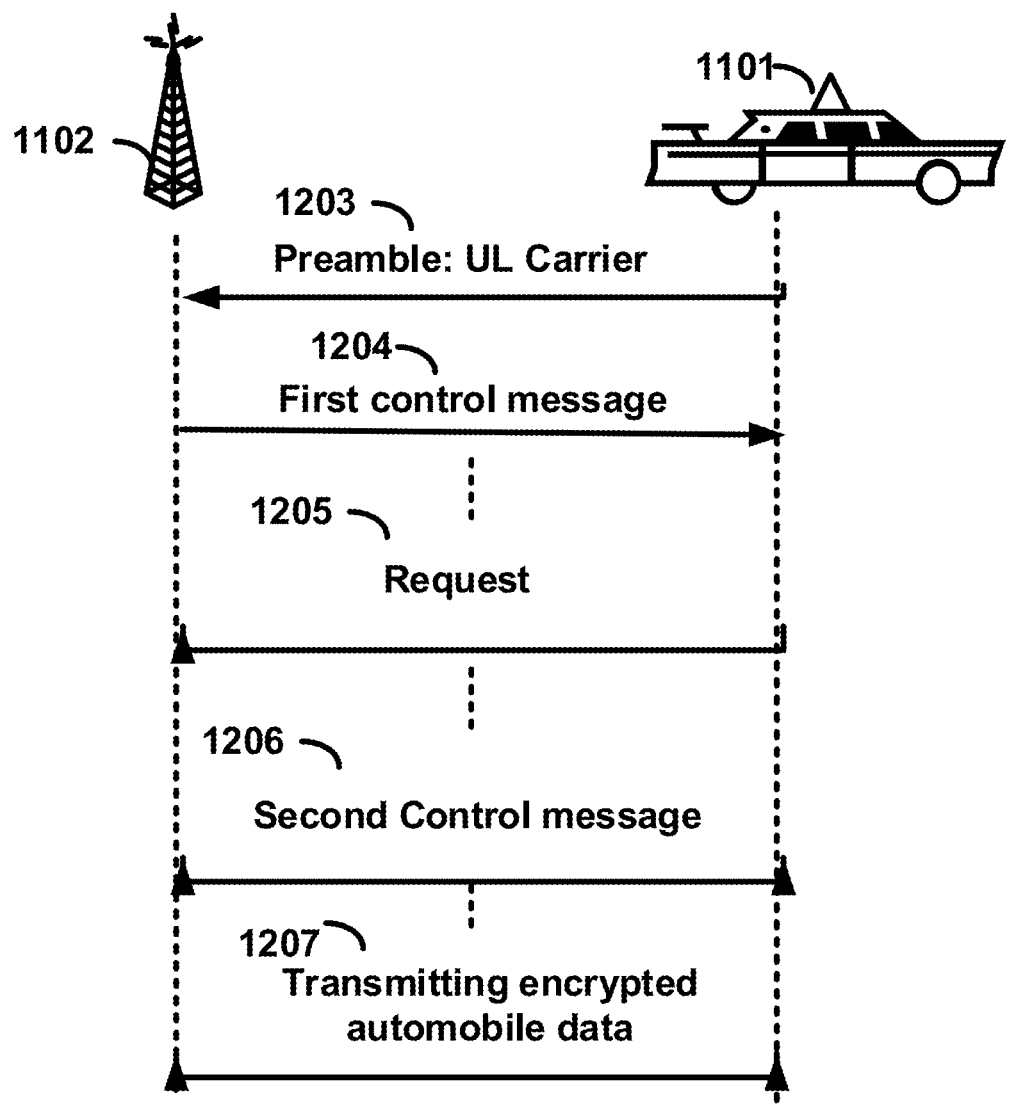
FIG. 12 depicts example message flows between a base station and an automobile device as per an aspect of an embodiment of the present invention.

FIG. 12 depicts example message flows between a base station and an automobile device as per an aspect of an embodiment of the present invention. According to some of the various aspects of embodiments, an automobile communication device 1101 may receive at least one first message from one of a plurality of peripheral devices installed in an automobile. The at least one message may trigger a request configured to be transmitted to at least one application server in a communication network. The at least one message may be generated in response to an automobile user input to the one of the plurality of peripheral devices. The automobile communication device may transmit a first random access preamble 1203 to a base station 1102 over a primary cell of a plurality of cells in response to receiving the at least one message. The automobile communication device may receive at least one first control message from the base station. The at least one first control message may be configured to cause configuration of a primary cell group in the automobile communication device. The primary cell group may comprise at least one cell. The primary cell group may comprise a primary cell and zero or more secondary cells. The configuration of only the primary cell group may imply that no cell groups is configured in the wireless device and all the configured cell(s) employ the primary cell as the reference cell.

The automobile communication device may transmit to the base station, the request over the primary cell group. The request may be destined to the application server. The automobile communication device may receive over the primary cell group a first plurality of packets. The first plurality of packets originated from the application server. The automobile communication device may receive over the primary cell group at least one second control message configured to cause configuration of a secondary cell group at 1206. The secondary cell group may comprise at least one secondary cell. The base station may selectively decide to configure the secondary cell group, for example, because the base station receives a buffer status report after transmission of the first control message, or because the base station receives automobile data from an application server. The base station makes the decision based on various factors, for example, base station load, traffic size, congestion, the required bit rate, and/or the like. The automobile communication device may receive over the primary cell group an activation command at least activating a subset of secondary cells in the secondary cell group. The automobile communication device may transmit, to the base station, a second random access preamble on a cell in the subset of the secondary cell group in response to receiving a PDCCH order from the base station. This may initiate a process to synchronize the secondary cell group. The base station may selectively decide not to synchronize the secondary cell group (and not to transmit the PDCCH order). The automobile communication device may receive from the base station, a second plurality of packets over the primary cell group and the secondary cell group at 1207. The automobile communication device may forward the first plurality of packets and the second plurality of packets to the one of the plurality of peripheral devices. This process may be used for both uploading or downloading data by the automobile communication device. In this example embodiment both primary and secondary cell groups may be configured and activated for transmission of automobile data. The secondary cell group is configured and activated when and if needed. This may reduce signaling and power consumption in the automobile communication device. This process may provide higher data rate for communication between the automobile communication device and the base station.

According to some of the various aspects of embodiments, the at least one first message may be, for example, an electrical signal generated by the one of the plurality of peripheral devices, a packet generated by the one of the plurality of peripheral devices, a packet or signal generated by a processor, and/or the like. The one of the plurality of peripheral devices is one of the following: a navigation system, an entertainment system with a display, a radio system, an audio system, a sensor system, an automobile control system, and a processor, a combination of the above, and/or the like. The one of the plurality of peripheral devices may transmit some of the received the first plurality of packets and the second plurality of packets to a display device. For example, the peripheral device may be a navigation system, a display system in the back seat area, a digital display, and/or the like. The automobile communication device may be installed in an automobile. The automobile may be one of a motorcycle, a car, a train, and a truck. The automobile user input is entered employing an input console in an automobile, for example, front dashboard, a touch screen input device, keyboard, buttons, and/or the like. The automobile communication device may receive the at least one first message via a short range wireless technology. The automobile communication device may forward the first plurality of packets and the second plurality of packets to the one of the plurality of peripheral devices via a short range wireless technology. In another example implementation, a processor may receive and transmit packets to some peripheral devices via a short range technology, and interface with a wireline technology with the automobile communication device. Short range technology may be employed to perform at least some of the internal communications in an automobile. The automobile communication device may be connected to an automobile via a connector. The one of a plurality of peripheral devices may be an on-board computer. The on-board computer receives the automobile user input via external devices accessible by an automobile user. The automobile communication device may use electrical power provided by at least one battery installed in an automobile. The automobile communication device may have its own battery, and receives the at least one first message via a short range wireless technology. The automobile communication device may be pre-configured with a network address of the application server and a network address of the automobile communication device.

According to some of the various aspects of embodiments, the at least one first message may be received by the automobile communication device when a pre-defined condition is met. The predefined condition may be met, for example, when the automobile engine is turned off, when the automobile is turned off, when the automobile engine is turned, when the automobile is turned on, and/or the like. The pre-defined condition may be met according to the value of an internal timer and/or a sensor input.

According to some of the various aspects of embodiments, the automobile communication device may receive random access parameters from the base station. The parameters may be employed for generating the first random access preamble and the second random access preamble. The first plurality of packets and the second plurality of packets may be transmitted over a non-GBR bearer with a guaranteed minimum bit rate and/or a maximum allowed transmission rate. The first plurality of packets and the second plurality of packets may be transmitted over a GBR bearer with a guaranteed bit rate. The automobile communication device may transmit the request to the application server over a radio bearer. The request may trigger establishing a connection with the server. The automobile communication device may receive, a second message from the application server over a radio bearer. The second message may indicate start of transmission the first plurality of packets to the automobile communication device. The application server may include a plurality of server computers. The application server may be a distributed server or a server farm. The base station may forward the request to the application server employing Internet protocol. The base station may add a header to the request. The header may include the IP address of the base station and an IP address of an intermediate node between the base station and the application server.

According to some of the various aspects of embodiments, the random access procedure may be initiated by a PDCCH order or by the MAC sublayer itself. Random access procedure on an SCell may be initiated by a PDCCH order. If a UE receives a PDCCH transmission consistent with a PDCCH order masked with its C-RNTI (radio network temporary identifier), and for a specific serving cell, the UE may initiate a random access procedure on this serving cell. For random access on the PCell a PDCCH order or RRC optionally indicate the ra-PreambleIndex and the ra-PRACH-MaskIndex; and for random access on an SCell, the PDCCH order indicates the ra-PreambleIndex with a value different from zero and the ra-PRACH-MaskIndex. For the pTAG preamble transmission on PRACH and reception of a PDCCH order may only be supported for PCell.

According to some of the various aspects of embodiments, the procedure may use some of the following information: a) the available set of PRACH resources for the transmission of the random access preamble, prach-ConfigIndex, b) for PCell, the groups of random access preambles and/or the set of available random access preambles in each group, c) for PCell, the preambles that are contained in random access preambles group A and Random Access Preambles group B are calculated, d) the RA response window size ra-ResponseWindowSize, e) the power-ramping factor powerRampingStep, f) the maximum number of preamble transmission preambleTransMax, g) the initial preamble power preambleInitialReceivedTargetPower, h) the preamble format based offset DELTA_PREAMBLE, i) for PCell, the maximum number of Msg3 HARQ transmissions maxHARQ-Msg3Tx, j) for PCell, the Contention Resolution Timer mac-ContentionResolutionTimer. These parameters may be updated from upper layers before each Random Access procedure is initiated.

According to some of the various aspects of embodiments, the Random Access procedure may be performed as follows: Flush the Msg3 buffer; set the PREAMBLE_TRANSMISSION_COUNTER to 1; set the backoff parameter value in the UE to 0 msec; for the RN (relay node), suspend any RN subframe configuration; proceed to the selection of the Random Access Resource. There may be one Random Access procedure ongoing at any point in time. If the UE receives a request for a new Random Access procedure while another is already ongoing, it may be up to UE implementation whether to continue with the ongoing procedure or start with the new procedure.

According to some of the various aspects of embodiments, the Random Access Resource selection procedure may be performed as follows. If ra-PreambleIndex (Random Access Preamble) and ra-PRACH-MaskIndex (PRACH Mask Index) have been explicitly signaled and ra-PreambleIndex is not zero, then the Random Access Preamble and the PRACH Mask Index may be those explicitly signaled. Otherwise, the Random Access Preamble may be selected by the UE.

The UE may determine the next available subframe containing PRACH permitted by the restrictions given by the prach-ConfigIndex, the PRACH Mask Index and physical layer timing requirements (a UE may take into account the possible occurrence of measurement gaps when determining the next available PRACH subframe). If the transmission mode is TDD and the PRACH Mask Index is equal to zero, then if ra-PreambleIndex was explicitly signaled and it was not 0 (i.e., not selected by MAC), then randomly select, with equal probability, one PRACH from the PRACHs available in the determined subframe. Else, the UE may randomly select, with equal probability, one PRACH from the PRACHs available in the determined subframe and the next two consecutive subframes. If the transmission mode is not TDD or the PRACH Mask Index is not equal to zero, a UE may determine a PRACH within the determined subframe in accordance with the requirements of the PRACH Mask Index. Then the UE may proceed to the transmission of the Random Access Preamble.

PRACH mask index values may range for example from 0 to 16. PRACH mask index value may determine the allowed PRACH resource index that may be used for transmission. For example, PRACH mask index 0 may mean that all PRACH resource indexes are allowed; or PRACH mask index 1 may mean that PRACH resource index 0 may be used. PRACH mask index may have different meaning in TDD and FDD systems.

The random-access procedure may be performed by UE setting PREAMBLE_RECEIVED_TARGET_POWER to preambleInitialReceivedTargetPower+DELTA_PRE-AMBLE+(PREAMBLE_TRANSMISSION_COUNTER−1)*powerRampingStep. The UE may instruct the physical layer to transmit a preamble using the selected PRACH, corresponding RA-RNTI, preamble index and PREAMBLE_RECEIVED_TARGET_POWER.

According to some of the various aspects of embodiments, once the random access preamble is transmitted and regardless of the possible occurrence of a measurement gap, the UE may monitor the PDCCH of the PCell for random access response(s) identified by the RA-RNTI (random access radio network identifier) a specific RA-RNTI defined below, in the random access response (RAR) window which may start at the subframe that contains the end of the preamble transmission plus three subframes and has length ra-ResponseWindowSize subframes. The specific RA-RNTI associated with the PRACH in which the Random Access Preamble is transmitted, is computed as: RA-RNTI=1+t_id+10*f_id. Where t_id may be the index of the first subframe of the specified PRACH (0≤t_id<10), and f_id is the index of the specified PRACH within that subframe, in ascending order of frequency domain (0≤f_id<6). The UE may stop monitoring for RAR(s) after successful reception of a RAR containing random access preamble identifiers that matches the transmitted random access preamble.

According to some of the various aspects of embodiments, if a downlink assignment for this TTI (transmission time interval) has been received on the PDCCH for the RA-RNTI and the received TB (transport block) is successfully decoded, the UE may regardless of the possible occurrence of a measurement gap: if the RAR contains a backoff indicator (BI) subheader, set the backoff parameter value in the UE employing the BI field of the backoff indicator subheader, else, set the backoff parameter value in the UE to zero msec. If the RAR contains a random access preamble identifier corresponding to the transmitted random access preamble, the UE may consider this RAR reception successful and apply the following actions for the serving cell where the random access preamble was transmitted: process the received riming advance command for the cell group in which the preamble was transmitted, indicate the preambleInitialReceivedTargetPower and the amount of power ramping applied to the latest preamble transmission to lower layers (i.e., (PREAMBLE_TRANSMISSION_COUNTER−1)*powerRampingStep); process the received uplink grant value and indicate it to the lower layers; the uplink grant is applicable to uplink of the cell in which the preamble was transmitted. If ra-PreambleIndex was explicitly signaled and it was not zero (e.g., not selected by MAC), consider the random access procedure successfully completed. Otherwise, if the Random Access Preamble was selected by UE MAC, set the Temporary C-RNTI to the value received in the RAR message. When an uplink transmission is required, e.g., for contention resolution, the eNB may not provide a grant smaller than 56 bits in the Random Access Response.

According to some of the various aspects of embodiments, if no RAR is received within the RAR window, or if none of all received RAR contains a random access preamble identifier corresponding to the transmitted random access preamble, the random access response reception may considered not successful. If RAR is not received, UE may increment PREAMBLE_TRANSMISSION_COUNTER by 1. If PREAMBLE_TRANSMISSION_COUNTER=preambleTransMax+1 and random access preamble is transmitted on the PCell, then UE may indicate a random access problem to upper layers (RRC). This may result in radio link failure. If PREAMBLE_TRANSMISSION_COUNTER=preambleTransMax+1 and the random access preamble is transmitted on an SCell, then UE may consider the random access procedure unsuccessfully completed. UE may stay in RRC connected mode and keep the RRC connection active eventhough a random access procedure unsuccessfully completed on a secondary TAG. According to some of the various aspects of embodiments, at completion of the random access procedure, the UE may discard explicitly signaled ra-PreambleIndex and ra-PRACH-MaskIndex, if any; and flush the HARQ buffer used for transmission of the MAC PDU in the Msg3 buffer. In addition, the RN may resume the suspended RN subframe configuration, if any.

According to some of the various aspects of embodiments, a UE may have a configurable timer timeAlignmentTimer per TAG. The timeAlignmentTimer is used to control how long the UE considers the Serving Cells belonging to the associated TAG to be uplink time aligned (in-sync). When a Timing Advance Command MAC control element is received, the UE may apply the riming advance command for the indicated TAG, and start or restart the timeAlignmentTimer associated with the indicated TAG. When a timing advance command is received in a RAR message for a serving cell belonging to a TAG and if the random access preamble was not selected by UE MAC, the UE may apply the timing advance command for this TAG, and may start or restart the timeAlignmentTimer associated with this TAG. When a timeAlignmentTimer associated with the pTAG expires, the UE may: flush all HARQ buffers for all serving cells; notify RRC to release PUCCH/SRS for all serving cells; clear any configured downlink assignments and uplink grants; and consider all running timeAlignmentTimers as expired. When a timeAlignmentTimer associated with an sTAG expires, then for all Serving Cells belonging to this TAG, the UE may flush all HARQ buffers; and notify RRC to release SRS. The UE may not perform any uplink transmission on a serving Cell except the random access preamble transmission when the timeAlignmentTimer associated with the TAG to which this serving cell belongs is not running. When the timeAlignmentTimer associated with the pTAG is not running, the UE may not perform any uplink transmission on any serving cell except the random access preamble transmission on the PCell. A UE stores or maintains N_TA (current timing advance value of an sTAG) upon expiry of associated timeAlignmentTimer. The UE may apply a received timing advance command MAC control element and starts associated timeAlignmentTimer. Transmission of the uplink radio frame number i from the UE may start $(N_{TA}+N_{TA\ offset}) \times T_s$ seconds before the start of the corresponding downlink radio frame at the UE, where $0 \leq N_{TA} \leq 20512$. In an example implementation, $N_{TA\ offset}=0$ for frame structure type 1 (FDD) and $N_{TA\ offset}=624$ for frame structure type 2 (TDD).

According to some of the various aspects of embodiments, upon reception of a timing advance command for a TAG containing the primary cell, the UE may adjust uplink transmission timing for PUCCH/PUSCH/SRS of the primary cell based on the received timing advance command. The UL transmission timing for PUSCH/SRS of a secondary cell may be the same as the primary cell if the secondary cell and the primary cell belong to the same TAG. Upon reception of a timing advance command for a TAG not containing the primary cell, the UE may adjust uplink transmission timing for PUSCH/SRS of secondary cells in the TAG based on the received timing advance command where the UL transmission timing for PUSCH/SRS is the same for all the secondary cells in the TAG.

The timing advance command for a TAG may indicates the change of the uplink timing relative to the current uplink timing for the TAG as multiples of $16T_s$ ($T_s$: sampling time unit). The start timing of the random access preamble may obtained employing a downlink synchronization time in the same TAG. In case of random access response, an 11-bit timing advance command, TA, for a TAG may indicate $N_{TA}$ values by index values of TA=0, 1, 2, . . . , 1282, where an amount of the time alignment for the TAG may be given by $N_{TA}=TA \times 16$. In other cases, a 6-bit timing advance command, TA, for a TAG may indicate adjustment of the current $N_{TA}$ value, $N_{TA,old}$, to the new $N_{TA}$ value, $N_{TA,new}$, by index values of TA=0, 1, 2, . . . , 63, where $N_{TA,new}=N_{TA,old}+(TA-31) \times 16$. Here, adjustment of $N_{TA}$ value by a positive or a negative amount indicates advancing or delaying the uplink transmission timing for the TAG by a given amount respectively. For a timing advance command received on subframe n, the corresponding adjustment of the uplink transmission timing may apply from the beginning of subframe n+6. For serving cells in the same TAG, when the UE's uplink PUCCH/PUSCH/SRS transmissions in subframe n and subframe n+1 are overlapped due to the timing adjustment, the UE may complete transmission of subframe n and not transmit the overlapped part of subframe n+1. If the received downlink timing changes and is not compensated or is only partly compensated by the uplink timing adjustment without timing advance command, the UE may change $N_{TA}$ accordingly.

Downlink frames and subframes of downlink carriers may be time aligned (by the base station) in carrier aggregation and multiple TAG configuration. Time alignment errors may be tolerated to some extent. For example, for intra-band contiguous carrier aggregation, time alignment error may not exceed 130 ns. In another example, for intra-band non-contiguous carrier aggregation, time alignment error may not exceed 260 ns. In another example, for inter-band carrier aggregation, time alignment error may not exceed 1.3 µs.

The UE may have capability to follow the frame timing change of the connected base station. The uplink frame transmission may take place $(N_{TA}+N_{TA\ offset}) \times T_s$ before the reception of the first detected path (in time) of the corresponding downlink frame from the reference cell. The UE may be configured with a pTAG containing the PCell. The pTAG may also contain one or more SCells, if configured. The UE may also be configured with one or more sTAGs, in which case the pTAG may contain one PCell and the sTAG may contain at least one SCell with configured uplink. In pTAG, UE may use the PCell as the reference cell for deriving the UE transmit timing for cells in the pTAG. The UE may employ a synchronization signal on the reference cell to drive downlink timing. When a UE is configured with an sTAG, the UE may use an activated SCell from the sTAG for deriving the UE transmit timing for cell in the sTAG.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

According to some of the various embodiments, physical downlink control channel(s) may carry transport format, scheduling assignments, uplink power control, and other control information. PDCCH may support multiple formats. Multiple PDCCH packets may be transmitted in a subframe. According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. PDCCH channel(s) may carry a plurality of downlink control packets in subframe(s). Enhance PDCCH may be implemented in a cell as an option to carrier control information. According to some of the various embodiments, PHICH may carry the hybrid-ARQ (automatic repeat request) ACK/NACK.

Other arrangements for PCFICH, PHICH, PDCCH, enhanced PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format. The transmission of a random access preamble, if triggered by the MAC layer, may be restricted to certain time and frequency resources. The start of a random access preamble may be aligned with the start of the corresponding uplink subframe at a wireless device with N_TA=0.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s). Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a primary carrier for random access response(s), in a random access response window. There may be a pre-known identifier in PDCCH that identifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier (if the carrier is uplink time aligned), CQI (channel quality indicator)/PMI(precoding matrix indicator)/RI(ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e., hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method comprising:
   receiving, from one or more first communication devices, a message;
   transmitting, to a second communication device via a first cell of a first cell group, a first random access preamble;
   transmitting, to the second communication device via the first cell group and based on the message, an indication of a request associated with application data;
   transmitting, via a second cell of a second cell group, a second random access preamble;
   receiving, via the first cell group and the second cell group, the application data; and
   transmitting the application data to at least one communication device of the one or more first communication devices.

2. The method of claim 1, further comprising associating the one or more first communication devices with an automobile, wherein the method is performed using electrical power provided by at least one battery installed in the automobile.

3. The method of claim 1, wherein the message is at least one of:
   an electrical signal generated by a communication device of the one or more first communication devices; or
   generated after receiving an input, from a user via an input console in an automobile, of a communication device of the one or more first communication devices.

4. The method of claim 1, wherein a short range wireless technology is used for at least one of:
   the receiving the message; or
   the transmitting the application data.

5. The method of claim 1, wherein the transmitting the indication of the request associated with application data is via a radio bearer, and wherein the indication of the request associated with application data is configured to trigger an establishment of a connection with one or more servers.

6. The method of claim 1, wherein a communication device of the one or more first communication devices is installed or integrated in an automobile and is configured to receive an input from a user via one or more external devices.

7. The method of claim 1, wherein the method is performed by an automobile communication device.

8. The method of claim 1, wherein the message comprises a packet generated by a communication device of the one or more first communication devices.

9. The method of claim 1, wherein the one or more first communication devices comprises at least one of:
   a navigation system;
   an entertainment system with a display;
   a radio system;
   an audio system;
   a sensor system; or
   an automobile control system.

10. The method of claim 1, wherein the second communication device is a base station, an eNodeB, a wireless communicator, or a relay node.

11. The method of claim 1, wherein the first cell group is associated with first uplink transmission timing and the second cell group is associated with second uplink transmission timing.

12. The method of claim 1, wherein the transmitting the application data is via at least one of:
   a wire; or
   a connector.

13. The method of claim 1, wherein the indication indicates one or more servers.

14. A communication device comprising:
   one or more processors; and
   memory storing instructions that, when executed by the one or more processors, cause the communication device to:
      receive, from one or more first communication devices, a message;
      transmit, to a second communication device via a first cell of a first cell group, a first random access preamble;
      transmit, to the second communication device via the first cell group and based on the message, an indication of a request associated with application data;
      transmit, via a second cell of a second cell group, a second random access preamble;
      receive, via the first cell group and the second cell group, the application data; and
      transmit the application data to at least one communication device of the one or more first communication devices.

15. The communication device of claim 14, wherein the instructions, when executed by the one or more processors, further cause the communication device to associate the one or more first communication devices with an automobile, wherein the instructions are executed by the one or more processors using electrical power provided by at least one battery installed in the automobile.

16. The communication device of claim 14, wherein the message is at least one of:
   an electrical signal generated by a communication device of the one or more first communication devices; or
   generated after receiving an input, from a user via an input console in an automobile, of a communication device of the one or more first communication devices.

17. The communication device of claim 14, wherein the instructions, when executed by the one or more processors, cause the communication device to use a short range wireless technology for at least one of:
   receiving the message; or
   transmitting the application data to the at least one communication device of the one or more first communication devices.

18. The communication device of claim 14, wherein the instructions, when executed by the one or more processors, cause the communication device to transmit the indication of the request associated with application data via a radio bearer, and wherein the indication of the request associated with application data is configured to trigger an establishment of a connection with one or more servers.

19. The communication device of claim 14, wherein a communication device of the one or more first communication devices is installed or integrated in an automobile and is configured to receive an input from a user via one or more external devices.

20. The communication device of claim 14, wherein the communication device is an automobile communication device.

21. The communication device of claim 14, wherein the message comprises a packet generated by a communication device of the one or more first communication devices.

22. The communication device of claim 14, wherein the one or more first communication devices comprises at least one of:
a navigation system;
an entertainment system with a display;
a radio system;
an audio system;
a sensor system; or
an automobile control system.

23. The communication device of claim 14, wherein the second communication device is a base station, an eNodeB, a wireless communicator, or a relay node.

24. The communication device of claim 14, wherein the first cell group is associated with first uplink transmission timing and the second cell group is associated with second uplink transmission timing.

25. The communication device of claim 14, wherein the instructions, when executed by the one or more processors, cause the communication device to transmit the application data via at least one of:
a wire; or
a connector.

26. The communication device of claim 14, wherein the indication indicates one or more servers.

27. A non-transitory computer-readable medium storing instructions that, when executed by one or more processors of a communication device, configure the communication device to:
receive, from one or more first communication devices, a message;
transmit, to a second communication device via a first cell of a first cell group, a first random access preamble;
transmit, to the second communication device via the first cell group and based on the message, an indication of a request associated with application data;
transmit, via a second cell of a second cell group, a second random access preamble;
receive, via the first cell group and the second cell group, the application data; and
transmit the application data to at least one communication device of the one or more first communication devices.

28. The non-transitory computer-readable medium of claim 27, wherein the instructions, when executed by the one or more processors, further cause configure the communication device to associate the one or more first communication devices with an automobile, wherein the instructions are executed by the one or more processors using electrical power provided by at least one battery installed in the automobile.

29. The non-transitory computer-readable medium of claim 27, wherein the message is at least one of:
an electrical signal generated by a communication device of the one or more first communication devices; or
generated after receiving an input, from a user via an input console in an automobile, of a communication device of the one or more first communication devices.

30. The non-transitory computer-readable medium of claim 27, wherein the instructions, when executed by the one or more processors, configure the communication device to use a short range wireless technology for at least one of:
receiving the message; or
transmitting the application data to the at least one communication device of the one or more first communication devices.

31. The non-transitory computer-readable medium of claim 27, wherein the instructions, when executed by the one or more processors, configure the communication device to transmit the indication of the request associated with application data via a radio bearer, and wherein the indication of the request associated with application data is configured to trigger an establishment of a connection with one or more servers.

32. The non-transitory computer-readable medium of claim 27, wherein a communication device of the one or more first communication devices is installed or integrated in an automobile and is configured to receive an input from a user via one or more external devices.

33. The non-transitory computer-readable medium of claim 27, wherein the communication device is an automobile communication device.

34. The non-transitory computer-readable medium of claim 27, wherein the message comprises a packet generated by a communication device of the one or more first communication devices.

35. The non-transitory computer-readable medium of claim 27, wherein the one or more first communication devices comprises at least one of:
a navigation system;
an entertainment system with a display;
a radio system;
an audio system;
a sensor system; or
an automobile control system.

36. The non-transitory computer-readable medium of claim 27, wherein the second communication device is a base station, an eNodeB, a wireless communicator, or a relay node.

37. The non-transitory computer-readable medium of claim 27, wherein the first cell group is associated with first uplink transmission timing and the second cell group is associated with second uplink transmission timing.

38. The non-transitory computer-readable medium of claim 27, wherein the instructions, when executed by the one or more processors, cause configure the communication device to transmit the application data via at least one of:
a wire; or
a connector.

39. The non-transitory computer-readable medium of claim 27, wherein the indication indicates one or more servers.

40. A method comprising:
receiving, from one or more first communication devices, a message;
transmitting, to a second communication device via a first cell of a first cell group, a first random access preamble;
transmitting, to the second communication device via the first cell group and based on the message, an indication associated with application data;
transmitting, via a second cell of a second cell group, a second random access preamble;

receiving, from at least one communication device of the one or more first communication devices, the application data; and transmitting, via the first cell group and the second cell group, the application data.

41. The method of claim 40, wherein a short range wireless technology is used for at least one of:
the receiving the message; or
the receiving the application data.

42. The method of claim 40, wherein the transmitting the indication is via a radio bearer, and wherein the indication is configured to trigger an establishment of a connection with one or more servers.

43. The method of claim 40, wherein a communication device of the one or more first communication devices is installed or integrated in an automobile and is configured to receive an input from a user via one or more external devices.

44. The method of claim 40, wherein the second communication device is a base station, an eNodeB, a wireless communicator, or a relay node.

45. The method of claim 40, wherein the first cell group is associated with first uplink transmission timing and the second cell group is associated with second uplink transmission timing.

46. The method of claim 40, wherein the indication indicates one or more servers.

47. A communication device comprising:
one or more processors; and
memory storing instructions that, when executed by the one or more processors, cause the communication device to:
receive, from one or more first communication devices, a message;
transmit, to a second communication device via a first cell of a first cell group, a first random access preamble;
transmit, to the second communication device via the first cell group and based on the message, an indication associated with application data;
transmit, via a second cell of a second cell group, a second random access preamble;
receive, from at least one communication device of the one or more first communication devices, the application data; and
transmit, via the first cell group and the second cell group, the application data.

48. The communication device of claim 47, wherein the instructions, when executed by the one or more processors, cause the communication device to use a short range wireless technology for at least one of:
receiving the message; or
receiving the application data from the at least one communication device of the one or more first communication devices.

49. The communication device of claim 47, wherein the instructions, when executed by the one or more processors, cause the communication device to transmit the indication via a radio bearer, and wherein the indication is configured to trigger an establishment of a connection with one or more servers.

50. The communication device of claim 47, wherein a communication device of the one or more first communication devices is installed or integrated in an automobile and is configured to receive an input from a user via one or more external devices.

51. The communication device of claim 47, wherein the second communication device is a base station, an eNodeB, a wireless communicator, or a relay node.

52. The communication device of claim 47, wherein the first cell group is associated with first uplink transmission timing and the second cell group is associated with second uplink transmission timing.

53. The communication device of claim 47, wherein the indication indicates one or more servers.

54. A non-transitory computer-readable medium storing instructions that, when executed by one or more processors of a communication device, configure the communication device to:
receive, from one or more first communication devices, a message;
transmit, to a second communication device via a first cell of a first cell group, a first random access preamble;
transmit, to the second communication device via the first cell group and based on the message, an indication associated with application data;
transmit, via a second cell of a second cell group, a second random access preamble;
receive, from at least one communication device of the one or more first communication devices, the application data; and
transmit, via the first cell group and the second cell group, the application data.

55. The non-transitory computer-readable medium of claim 54, wherein the instructions, when executed by the one or more processors, configure the communication device to use a short range wireless technology for at least one of:
receiving the message; or
receiving the application data from the at least one communication device of the one or more first communication devices.

56. The non-transitory computer-readable medium of claim 54, wherein the instructions, when executed by the one or more processors, configure the communication device to transmit the indication via a radio bearer, and wherein the indication is configured to trigger an establishment of a connection with one or more servers.

57. The non-transitory computer-readable medium of claim 54, wherein a communication device of the one or more first communication devices is installed or integrated in an automobile and is configured to receive an input from a user via one or more external devices.

58. The non-transitory computer-readable medium of claim 54, wherein the second communication device is a base station, an eNodeB, a wireless communicator, or a relay node.

59. The non-transitory computer-readable medium of claim 54, wherein the first cell group is associated with first uplink transmission timing and the second cell group is associated with second uplink transmission timing.

60. The non-transitory computer-readable medium of claim 54, wherein the indication indicates one or more servers.

61. A system comprising:
a base station comprising:
one or more processors; and
memory storing instructions that, when executed by the one or more processors of the base station, cause the base station to:
transmit a control message comprising configuration parameters of a first cell, wherein the first cell is of a first cell group; and a wireless device comprising:
- one or more processors; and
- memory storing instructions that, when executed by the one or more processors of the wireless device, cause the wireless device to:
  - receive, from one or more first communication devices, a message;
  - transmit, via the first cell, a first random access preamble;
  - transmit, via the first cell group and based on the message, an indication associated with application data;
  - transmit, via a second cell of a second cell group, a second random access preamble; and
  - perform:
    - transmitting, via the first cell group and the second cell group, the application data as received from at least one communication device of the one or more first communication devices; or
    - transmitting, to at least one communication device of the one or more first communication devices, the application data as received via the first cell group and the second cell group.

62. The system of claim 61, wherein the instructions stored in the memory of the wireless device, when executed by the one or more processors of the wireless device, cause the wireless device to use a short range wireless technology for at least one of:
- receiving the message;
- receiving the application data from the at least one communication device of the one or more first communication devices; or
- transmitting the application data, as received via the first cell group and the second cell group, to the at least one communication device of the one or more first communication devices.

63. The system of claim 61, wherein the instructions stored in the memory of the wireless device, when executed by the one or more processors of the wireless device, cause the wireless device to transmit the indication via a radio bearer, and wherein the indication is configured to trigger an establishment of a connection with one or more servers.

64. The system of claim 61, wherein a communication device of the one or more first communication devices is installed or integrated in an automobile and is configured to receive an input from a user via one or more external devices.

65. The system of claim 61, wherein the first cell group is associated with first uplink transmission timing and the second cell group is associated with second uplink transmission timing.

66. The system of claim 61, wherein the indication indicates one or more servers.

* * * * *

UNITED STATES PATENT AND TRADEMARK OFFICE
CERTIFICATE OF CORRECTION

| | |
|---|---|
| PATENT NO. | : 11,622,372 B2 |
| APPLICATION NO. | : 17/353232 |
| DATED | : April 4, 2023 |
| INVENTOR(S) | : Dinan |

It is certified that error appears in the above-identified patent and that said Letters Patent is hereby corrected as shown below:

On the Title Page

Page 5, Column 2, Item (56) Other Publications, Line 19:
Delete "transmissior" and insert --transmission-- therefor Page 6, Column 2, Item (56) Other Publications, Line 28:
Delete "Jun. 1," and insert --Jun. 18,-- therefor In the Specification Column 7, Detailed Description of Embodiments, Line 45:
Delete "NTA" and insert --$N_{TA}$-- therefor Column 7, Detailed Description of Embodiments, Line 49:
Delete "NTA=0." and insert --$N_{TA}$=0.-- therefor Column 11, Detailed Description of Embodiments, Line 19:
Delete "TAGS" insert --TAG3-- therefor Column 28, Detailed Description of Embodiments, Line 12:
Delete "Lab VIEWMathScript." and insert --LabVIEWMathScript.-- therefor In the Claims Column 31, Claim 28, Line 55:
After "further" delete "cause"

Column 32, Claim 38, Line 51:
After "processors," delete "cause"

Signed and Sealed this
Fifteenth Day of October, 2024

Katherine Kelly Vidal
*Director of the United States Patent and Trademark Office*